United States Patent
King et al.

(10) Patent No.: US 11,365,553 B2
(45) Date of Patent: Jun. 21, 2022

(54) DISPENSING SYSTEMS

(71) Applicants: Joseph King, Wayzata, MN (US);
Jeffrey Johnson, Edina, MN (US);
Paul Freeberg, South St. Paul, MN (US); David Guy, Maple Grove, MN (US); Terry Goeman, Minnetonka, MN (US); Kenneth V. Schomburg, Plymouth, MN (US)

(72) Inventors: Joseph King, Wayzata, MN (US);
Jeffrey Johnson, Edina, MN (US);
Paul Freeberg, South St. Paul, MN (US); David Guy, Maple Grove, MN (US); Terry Goeman, Minnetonka, MN (US); Kenneth V. Schomburg, Plymouth, MN (US)

(73) Assignee: KING TECHNOLOGY, INC., Hopkins, MN (US)

( * ) Notice: Subject to any disclaimer, the term of this patent is extended or adjusted under 35 U.S.C. 154(b) by 0 days.

(21) Appl. No.: 16/974,167

(22) Filed: Oct. 28, 2020

(65) Prior Publication Data
US 2021/0047852 A1 Feb. 18, 2021

Related U.S. Application Data

(62) Division of application No. 15/932,889, filed on May 15, 2018, now Pat. No. 10,883,288, which is a division of application No. 15/330,533, filed on Oct. 4, 2016, now Pat. No. 10,060,148, which is a division of application No. 14/545,413, filed on May 1, 2015, now Pat. No. 9,725,920.

(60) Provisional application No. 61/999,099, filed on Jul. 16, 2014.

(51) Int. Cl.
*E04H 4/12* (2006.01)
*C02F 1/68* (2006.01)
*C02F 103/42* (2006.01)

(52) U.S. Cl.
CPC .......... *E04H 4/1281* (2013.01); *C02F 1/685* (2013.01); *C02F 2103/42* (2013.01); *C02F 2201/005* (2013.01); *Y10T 137/4891* (2015.04); *Y10T 137/7838* (2015.04)

(58) Field of Classification Search
CPC .. E94H 4/1281; C02F 1/685; C02F 2201/005; B01F 1/005
USPC ..................... 137/516.25, 512, 268; 422/278
See application file for complete search history.

(56) References Cited

U.S. PATENT DOCUMENTS

| | | | |
|---|---|---|---|
| 3,502,442 A * | 3/1970 | Campbell | B01J 49/75 422/261 |
| 5,914,037 A * | 6/1999 | Yen | B01D 35/153 210/234 |
| 6,527,952 B1 * | 3/2003 | King | A01N 25/26 137/268 |
| 10,030,401 B2 * | 7/2018 | King | E04H 4/1281 |
| 10,883,288 B2 * | 1/2021 | King | C02F 1/685 |

* cited by examiner

*Primary Examiner* — Umashankar Venkatesan
(74) *Attorney, Agent, or Firm* — Johnson & Phung LLC

(57) ABSTRACT

A system for limiting the flow from a dispensing valve when a dispensing cartridge is replaced with the system including a dispenser cartridge with a cam and a water socket with a flow limiter therein that is activeable in response to the position of the dispenser cartridge in the dispensing valve and operable in response to an upstream fluid pressure in the dispensing valve.

10 Claims, 16 Drawing Sheets

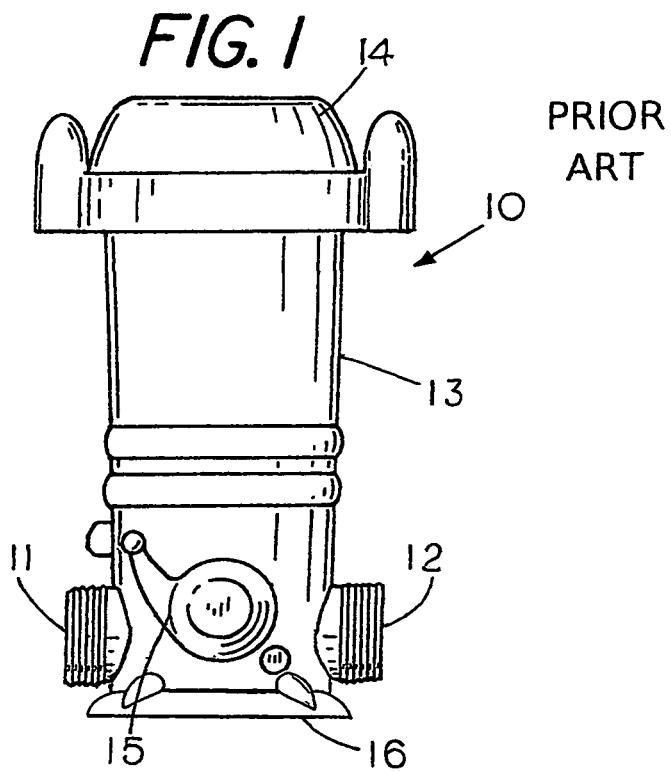
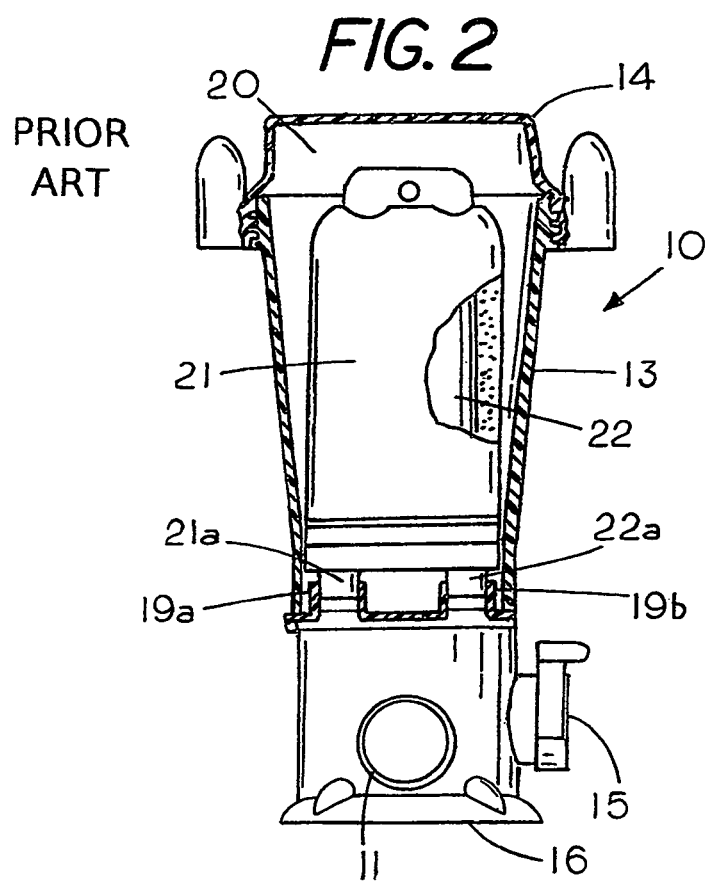

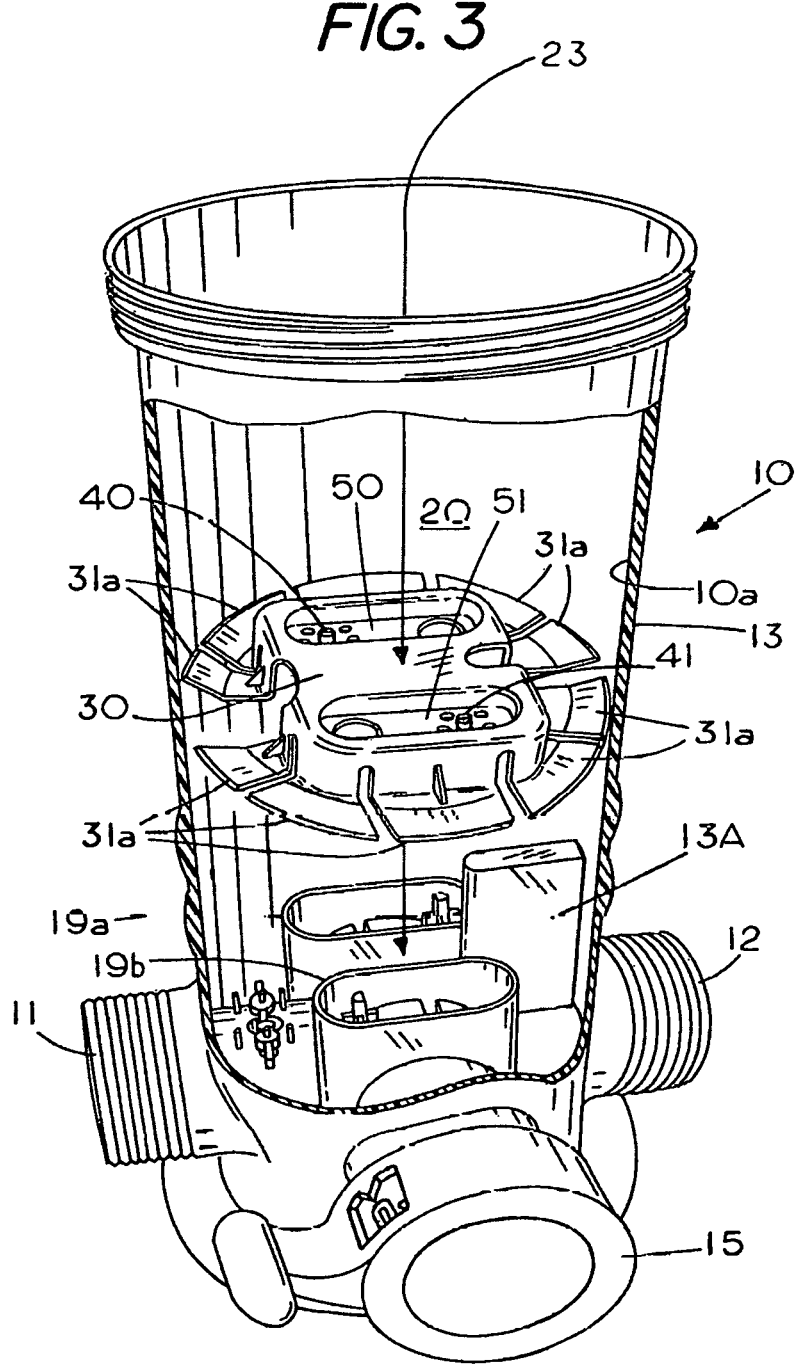

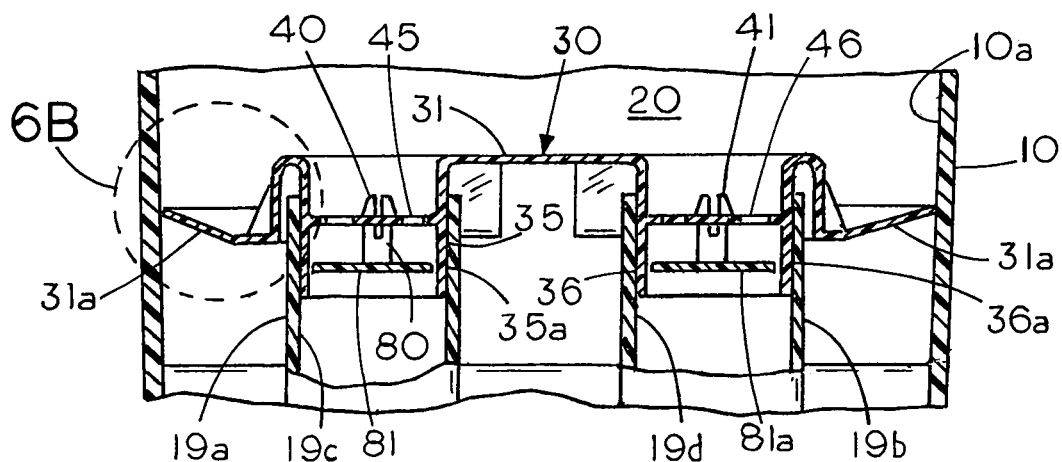
FIG.6A
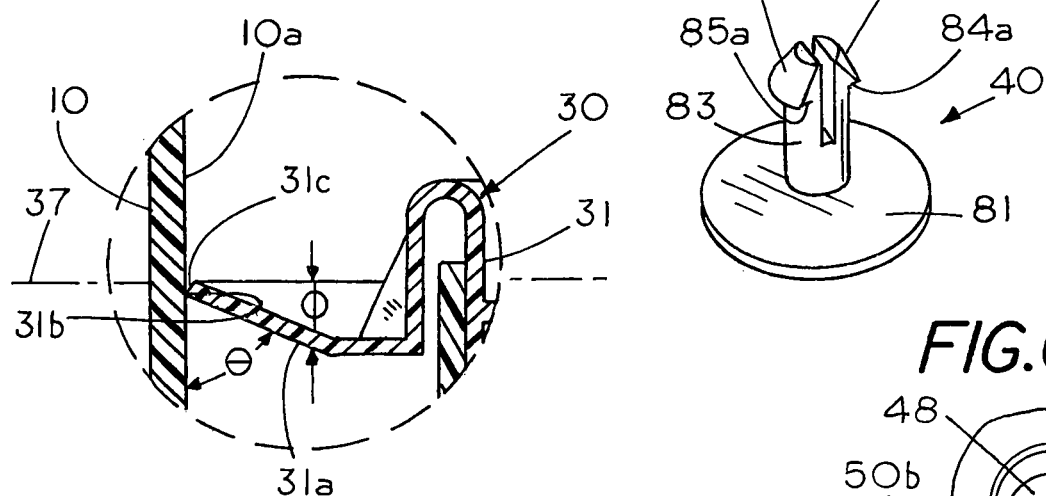
FIG.6B
FIG.6C
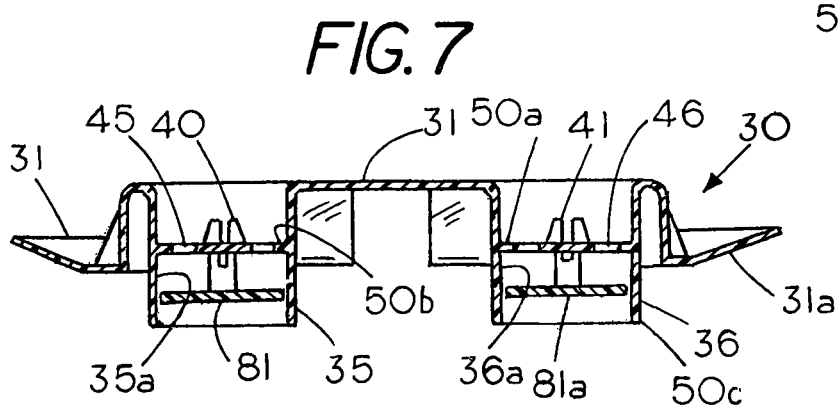
FIG.6D
FIG.7

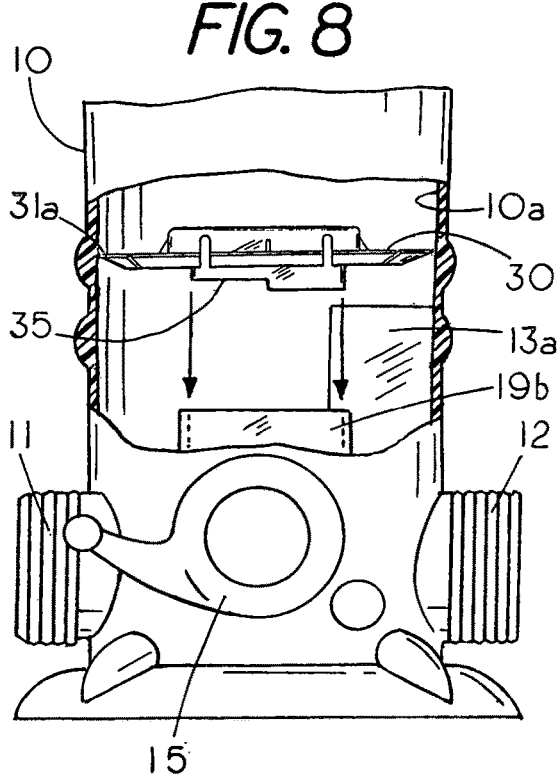
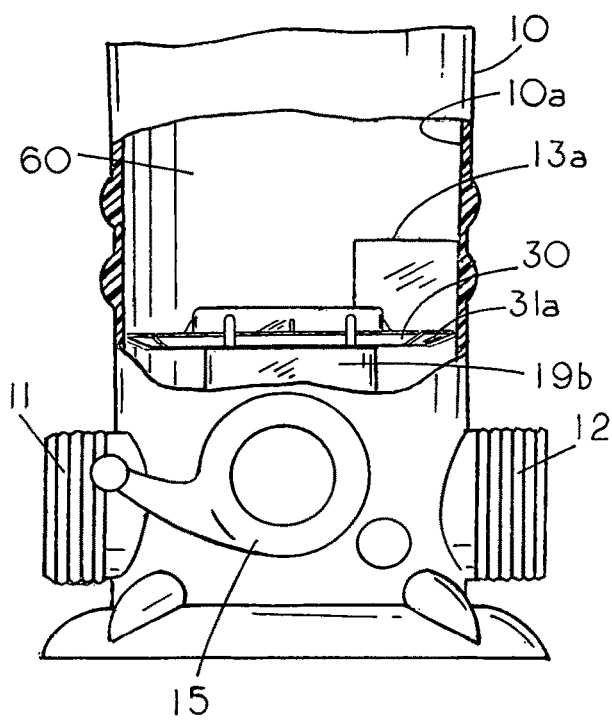
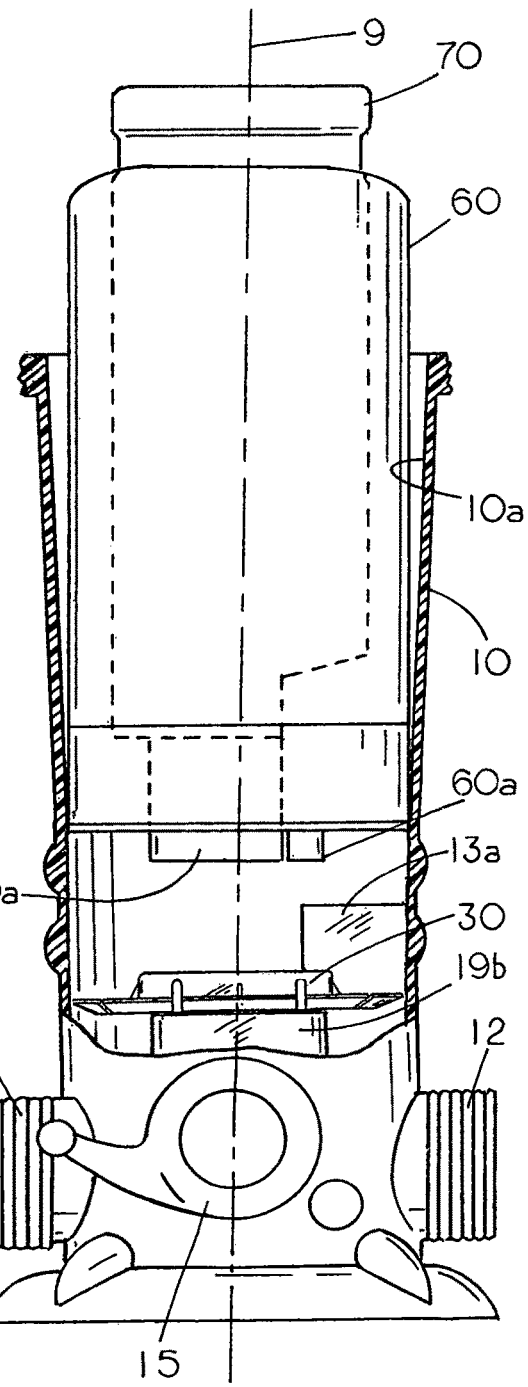

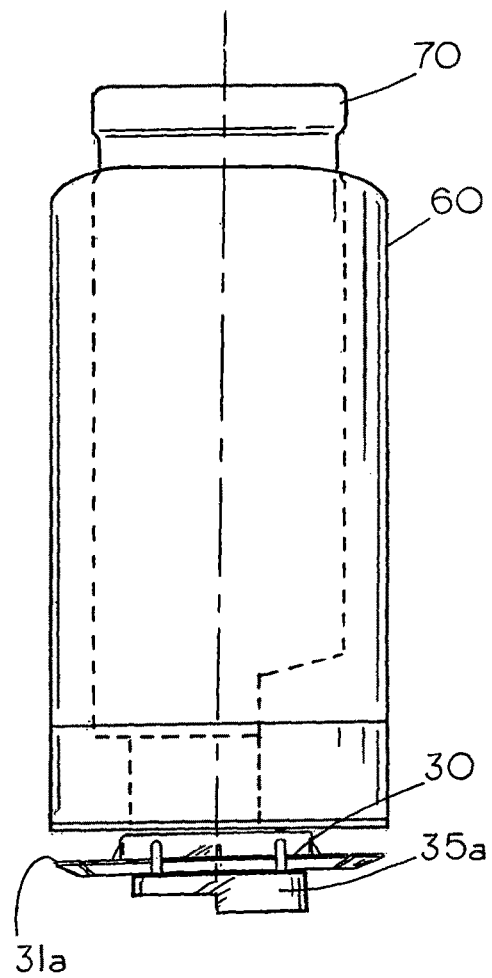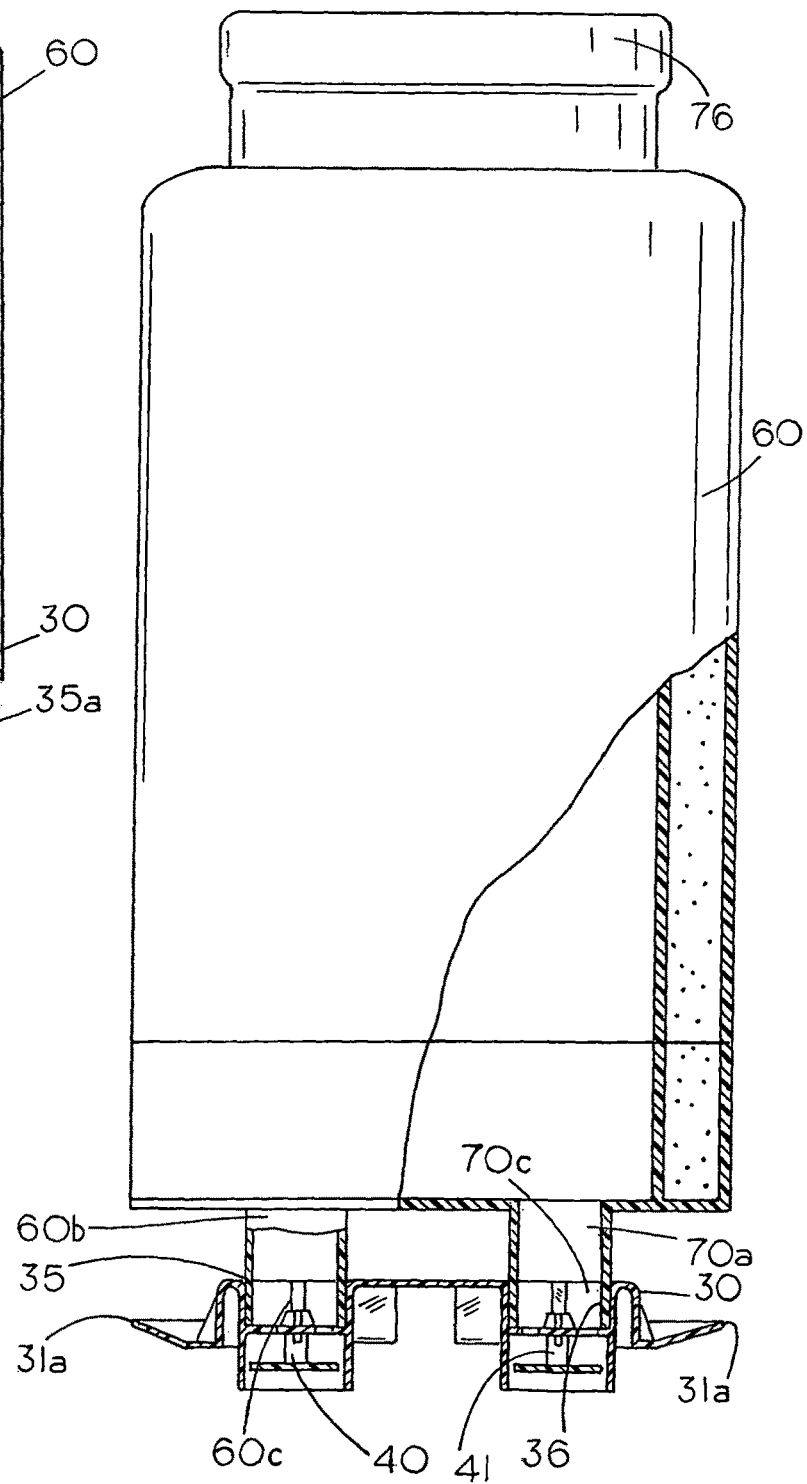

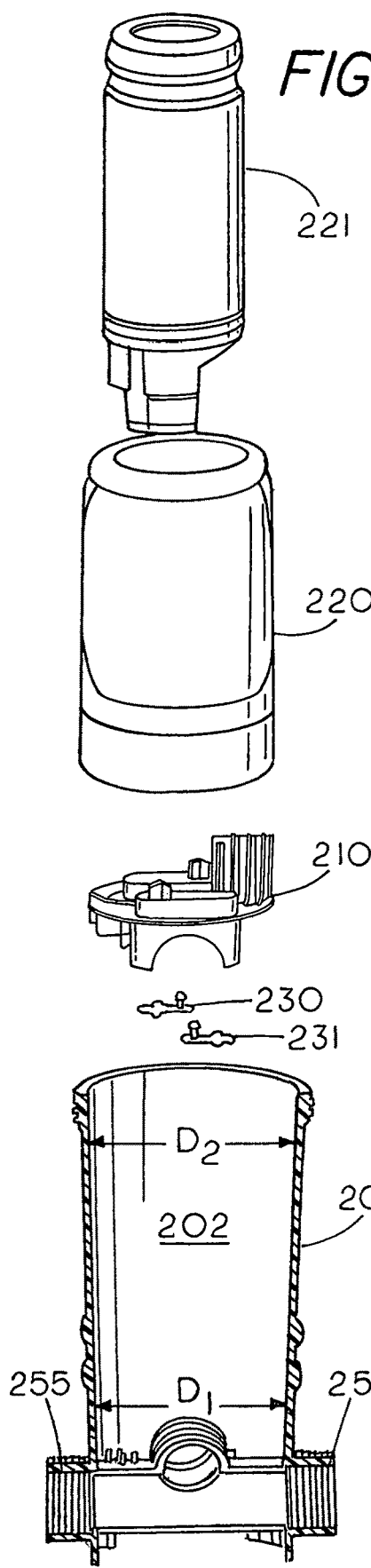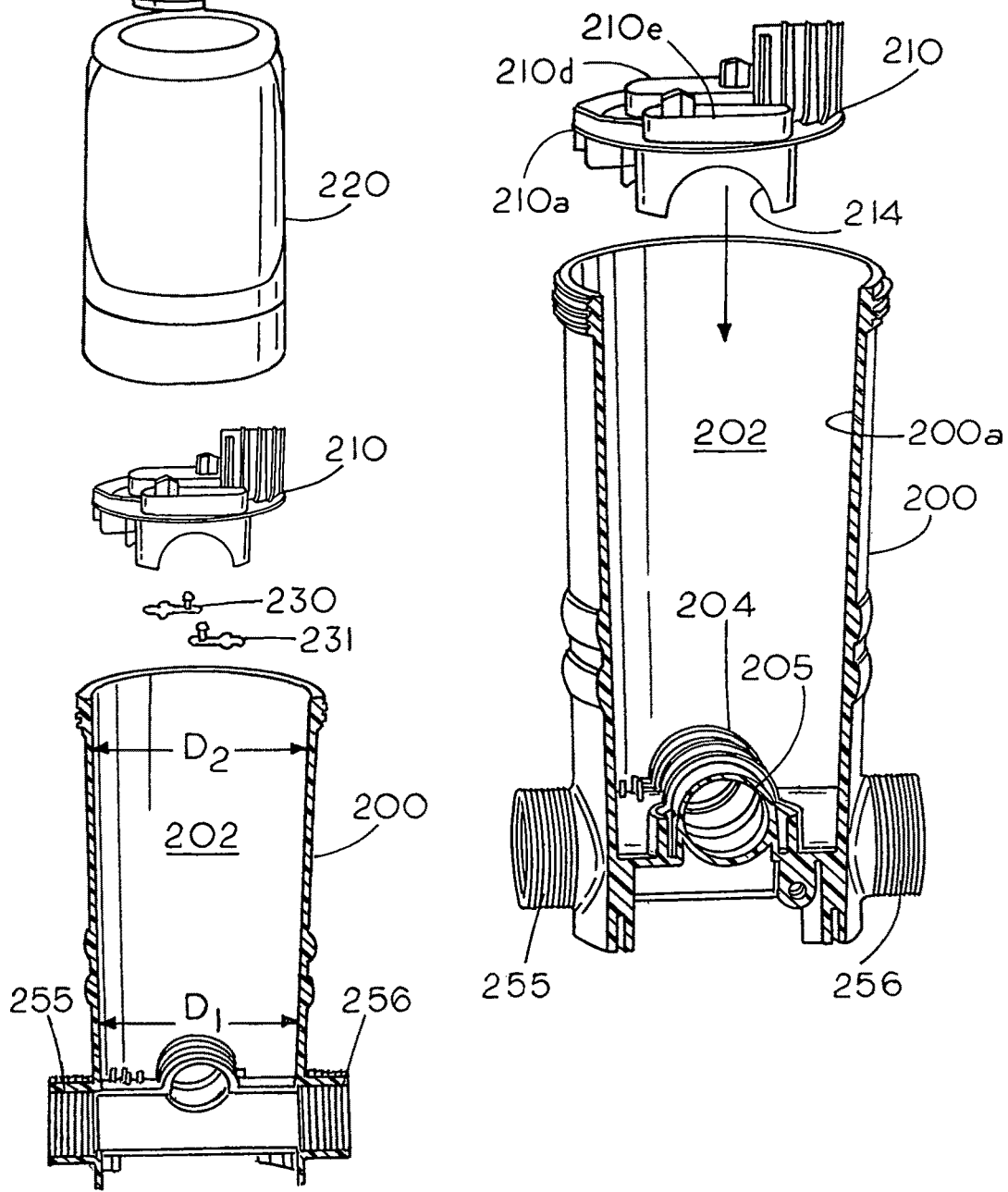

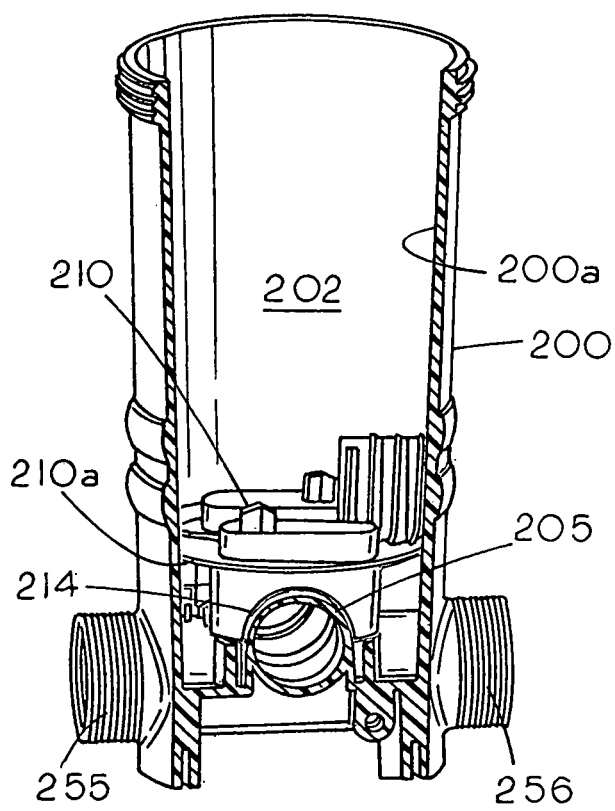
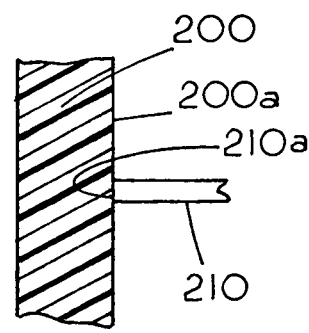
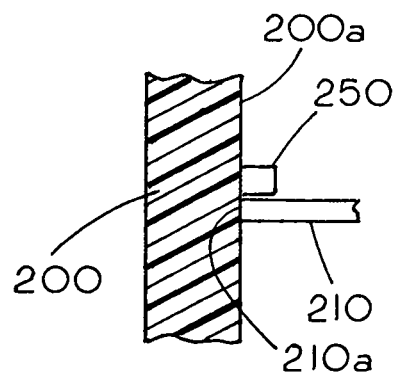

DISPENSING SYSTEMS

CROSS REFERENCE TO RELATED APPLICATIONS

This application is a division of patent application Ser. No. 15/932,889 filed May 15, 2018 (pending), which is a division of patent application Ser. No. 15/330,533 filed Oct. 4, 2016 (now U.S. Pat. No. 10,060,148), which is a division of application Ser. No. 14/545,413 filed May 1, 2015 titled DISPENSING SYSTEMS (now U.S. Pat. No. 9,752,920), which claims priority from provisional application 61/999,099 filed Jul. 16, 2014 titled Dispensing Systems.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concepts of dispensers for delivering water purification material into a body of water such as a pool or the like are known in the art. One such example is shown in U.S. Pat. No. 6,210,566 which shows nestable canisters for use in inline dispersal valves that normally hold only a single canister with the nestable canisters suitable for replacing the single canister, which disperses a single chemical dispersant, with a first canister to disperse a first dispersant and a second canister to disperse a second dispersant. The dual canisters permit simultaneous but separate treatment of a temporarily bifurcated fluid stream that flows through a set of dispersal valve ports that were normally used for dispensing only one chemical dispersant into the dispersal valve. In addition, the nestable canisters may be provided with an improved bactericide and algaecide for killing bacteria and algae in the water with each of the canisters including a set of ports that connect to the inlet and outlet port in the inline dispenser.

A number of patents show valves or the like for controlling the flow through some type of inline dispensing system.

U.S. Pat. No. 7,875,170 shows a treatment system with a set of valves to control the flow of liquid through the treatment system.

U.S. Pat. No. 3,406,870 shows a swimming pool chlorinator that uses a ball valve to control flow of material into the body of water.

U.S. Pat. No. 3,596,812 shows a valve block for supplying chlorine that uses a ball valve to control the flow of liquid.

U.S. Pat. No. 5,476,116 shows a chlorinator that contains an opening that is formed by the relative position of two members with slots.

U.S. patent application 2011/0163124 shows a granular chemical dispenser that uses ganged valves to control the inlet to the dispenser.

U.S. Pat. No. 8,505,565 shows a device for treating or sensing through the use of flow sensors or objects acted upon by the flowing water.

King U.S. Pat. No. 6,210,566 shows an inline dispenser having replaceable cartridges container within a chamber of the inline dispenser.

U.S. patent application 2002/0153043 discloses a pool chlorinator with a check valve to prevent the water and gases to enter the chemical compartment through the return port.

SUMMARY OF THE INVENTION

A consumer friendly device for a dispensing valve comprising a converter with a cartridge activeable flow limiter for changing a normally open port-dispensing valve into a normally closed port dispensing valve when there is no dispensing cartridge in the dispensing valve. In one example the invention comprises a dispensing system wherein the dispensing cartridges carried by a dispensing valve can be replaced on the go with the dispensing valve including a flow limiter that reduces or shuts off the flow of fluid from a dispensing valve port when one of the dispensing cartridges is removed from a chamber in the dispensing valve. The converter allows one to convert a conventional dispensing valve to a flow limiting valve through the insertion of a converter containing flow limiters with the converter self securable to an interior surface of a dispensing valve and mateable with the existing ports of the dispensing valve. In another example the invention includes a cartridge dispenser that is mountable within a dispensing valve with the cartridge dispenser including a deactivator engageable with a flow limiter in the converter for opening the flow limiter when the cartridge dispenser is in a dispensing condition. The flow limiter is normally maintainable in a closed condition through the pressure forces acting on an underside of the flow limiter. Other features and examples are described herein.

BRIEF DESCRIPTION OF THE DRAWINGS

FIG. 1 is a front view of a dispensing valve for delivering water treatment materials to a swimming pool;

FIG. 2 is a cutaway view of a dispensing valve containing replaceable dispenser cartridges;

FIG. 3 is a cutaway view showing a converter being inserted into a prior art dispenser;

FIG. 6A is a side view in section showing the converter frictionally mounted in a dispenser housing;

FIG. 6B is an isolated view of the cantilevered radial fins on the converter;

FIG. 6C is a perspective of a flow limiter;

FIG. 6D is an isolated view of an end cap without a flow limiter therein;

FIG. 7 is a side view of the converter of FIG. 4 taken along lines 6,7 with the converter in a flow through condition;

FIG. 8 is a side view partially in section shown the converter of FIG. 5 about to be inserted on the extension sockets of the inline dispenser;

FIG. 9 is a side view partially in section shown the converter of FIG. 5 engaged with the extension sockets of the inline dispenser;

FIG. 10 is a side view partially in section shown a set of dispensing cartridges to be inserted into the converter, which is mounted on the extension sockets of the inline dispenser;

FIG. 14 is a front view of a set of cartridge s mounted in a converter;

FIG. 15 is a partial sectional view through the sockets similar to the view along lines 6,7 of FIG. 4;

FIG. 16 is an exploded view of a set of dispensing cartridges, a converter and a bulk feeder;

FIG. 17 is a partial sectional view of a bulk feeder and a converter for axial insertion into a compartment in the bulk feeder;

FIG. 17A shows a converter mounted in a bulk feeder;

FIG. 17B shows a converter edge in engagement with a bulk feeder;

FIG. 17C shows a converter edge in engagement with a bulk feeder;

DESCRIPTION OF THE PREFERRED EMBODIMENT

Figure 4:
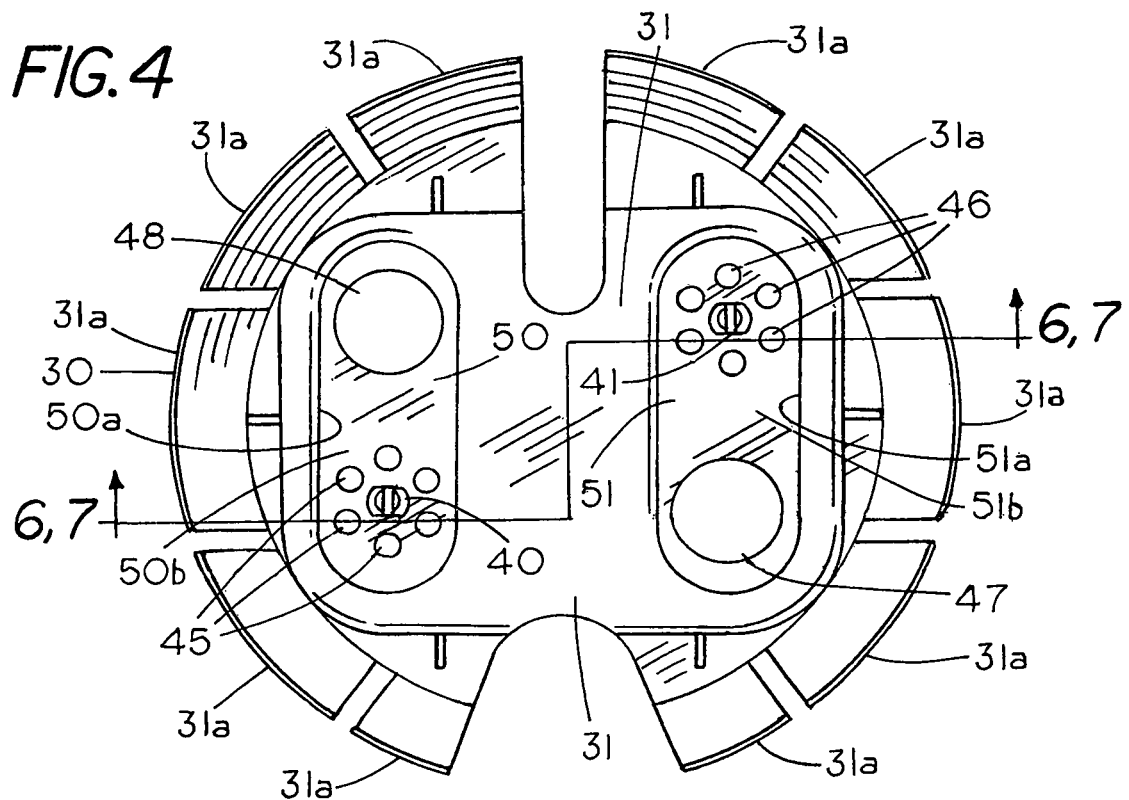
FIG. 4 shows a top view of the converter.

FIG. 1 is a front view of a typical dispensing valve 10 for delivering water treatment materials to a swimming pool or the like. The dispensing valve 10 includes a base or flange 16, with an inlet fitting 11 on one end and an outlet fitting 12 on the opposite end. On top of flange 16 is a housing 13 having a cover 14 that is securable to the housing 13. The cover allows one to remove and insert fresh cartridges into a chamber in the dispensing valve 10. A rotateable control valve 15 allows one to control the amount of water that is diverted through the housing 13 and the dispensing cartridges that are located within the chamber in the housing 13. An example of an inline dispensing valve is shown in King et al. U.S. Pat. No. 8,464,743 and is herby incorporated by reference.

FIG. 2 is a cutaway view of a dispensing system with the dispensing valve 10 of FIG. 1 showing a first cylindrical dispensing canister 22 and a second annular dispensing canister 21 located in a nested relationship in a dispenser cartridge compartment or chamber 20 within housing 13.

Each of canisters 21 and 22 have a set of bottom extensions or sockets with ports for directing water into the dispersants in the canisters 21 and 22 and then returning water with dispersants therein into an outlet in the dispenser 10. In this example an extension or socket 21a of canister 21 is visible and in engagement with extension or water socket 19a of dispenser 10. Similarly, an extension or socket 22a of canister 22 is visible and in engagement with extension or water socket 19b of the dispenser 10. Each of the sockets includes a first set of ports to allow fluid to flow from the dispensing valve into the dispersant in the dispensing cartridges and then return through another set of ports. An example of a dispensing system where two dispensing cartridges are fitted into the chamber of the housing to deliver multiple dispersants to a body of water can be found in King U.S. Pat. No. 6,210,566, which is herby incorporated by reference.

FIG. 3 is a cutaway view of an inline dispensing valve 10 showing the axial insertion of a converter or backflow limiter 30, which contains a first flow limiter 40 and a second flow limiter 41 that limits or prevents backflow of water into the chamber 20 of dispensing valve 10. The arrow indicates the axial direction of insertion of the converter 30 into the lower end of the chamber 20 where features on the underside of converter 30 mate with the first extension socket 19a in dispensing valve 10 and the second extension socket 19b in dispensing valve 10. Normally, the extension socket 19a and extension socket 19b of the dispensing valve 10 mates directly to a set of extension sockets on a set of dispensing cartridges, which enables the inline extension socket 19a and extension socket 19b to direct water to and from the mating dispensing cartridges in the dispensing valve. In this example, a converter or adapter 30 is about to be attached to the interior of dispensing valve 10 with the converter 30 forming a functional interface between the dispensing valve 10 and the dispensing cartridges located in the dispensing valve. Converter 30 contains a first flow limiter 40 or canister deactiveable valve and a second flow limiter 41 or a canister deactiveable valve for positioning in flow paths between the dispensing valve 10 and the dispenser cartridges in the dispensing valve 10. A feature of the invention is that the flow limiters do not interfere with the flow during the dispensing of materials from the cartridges in the dispensing valve 10 but prevent or inhibit backflow through the chamber of the dispensing valve 10 when a dispensing cartridge is replaced. Thus a benefit of the flow limiters is that they minimize or eliminate adverse effects during the replacement of a spent cartridge without interfering with the performance of the dispensing valve. Thus problems due to backflow can be minimized or eliminated through placement of a converter in an existing dispensing valve and without adversely affecting the operation of the system.

Converter 30 is preferably made of a polymer plastic that is resistant to the dispersants and is rigid but with sufficiently resilient fins 31a that form locking frictional engagement with the sidewalls of the dispenser housing while a set of bottom sockets 35 and 36 (FIG. 7) form mating frictional engagement with the extension water sockets 19a and 19b of the dispensing valve 10.

FIG. 3 shows the dispenser housing 13 includes an internal locater 13A to enable one to correctly position dispensing cartridges within the chamber 20. In this example the locater 13A can be used to correctly align and position the converter 30 in the bottom of chamber 20. A feature of the invention is that converter 30 can be hand mounted within dispensing valve 10 without the aid of tools and adhesives although one may elect to use tools or adhesives if so desired. That is, converter 30 can be securely mounted within dispensing valve 10 through frictional engagement between a set of radial fins 31*a* and the chamber sidewall 10*a* as well as the mating engagement between the extensions 19*a* and 19*b* on the dispensing valve 10 and a set of socket extensions 35 and 36 on the under side of converter 30. In this example the mating and frictional engagement between the housing and the converter maintains the converter 30 in a fixed condition within the dispensing valve 10. A benefit of the converter 30 is that because of its unique frictional mounting within the dispensing valve it allows a pool owner to update his or her dispensing valve by his or her self without the use of tools. A further benefit is that the converter 30 allows one to introduce flow limiters into an existing circulation system without having to replace the dispensing valve or to modify any of the structure of the dispensing valve. Thus the consumer benefits from a quick conversion from a non-flow limiting system to a flow limiting system. In addition the consumer benefits since the out of pocket expenses for system conversion are eliminated as the consumer avoids the expense of hiring a person to make the conversion.

Figure 6:
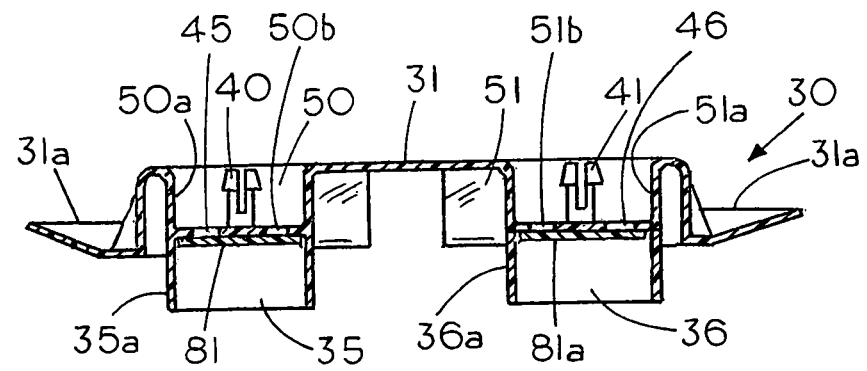
FIG. 6 is a side view of the converter of FIG. 4 taken along lines 6,7-6,7 with the converter in a flow limiting condition.

While FIG. 3 shows a converter 30 being axially inserted into a dispensing valve 10 FIG. 4 shows an isolated top view of converter 30 revealing a set of radial fins 31*a*, which are cantilevered radially outward from a central hub 31. Fins 31*a*, while rigid, are cantilevered to provide resiliency for forming frictional engagement with a smooth sidewall of a dispensing valve. As shown in FIG. 4 converter 30 includes a first top socket 50 having an inner socket sidewall 50*a* and a web or end cap forming a socket bottom member 50*b* having a fluid passage 48 and a plurality of smaller fluid passages 45 that are located proximate flow limiter 40 and a second top socket 51 with an inner socket sidewall 51*a* and a web or an end cap forming a socket bottom member 51*b* having a fluid passage 47 and a plurality of smaller fluid passages 46 that are located proximate flow limiter 41. As can be seen in FIG. 6 the top socket 50 and the bottom socket 35 share an end cap 50*b*. Similarly the top socket 51 and the bottom socket 36 share an end cap 51*b*. When converter 30 is in a dispensing condition the plurality of fluid passages 45 and the plurality of fluid passages 46 permit ingress of fluid therethrough since flow limiter 40 and flow limiter 41 are automatically deactivated when dispensing cartridges are inserted into a dispensing valve carrying the converter 30. Therefore, in normal operation of the dispensing valve 10 the flow limiters 40 and 41 do not limit or interfere with the normal flow of dispersants between the dispensing cartridges and the dispensing valve. However, when converter 30 is in the flow limiting condition the flow limiters 41 and 42 form an obstruction to fluid ports 45 and 46 to limit or block flow therethrough.

Figure 5:
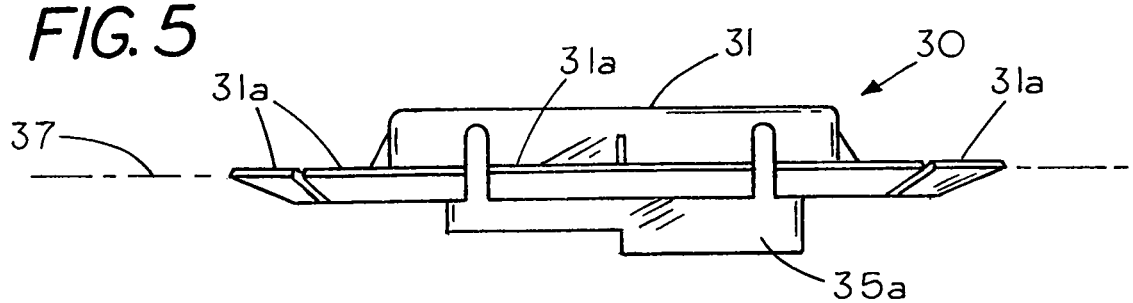
FIG. 5 is a side view of the converter of FIG. 3.

In order to appreciate the operable and deactivated condition of flow limiters 40 and 41 reference should be made to FIGS. 5-7. FIG. 5 shows a side view of converter 30 with the flow limiters concealed within the converter 30. In order to reveal the flow limiting position of the flow limiters and non flow limiting position of the flow limiters reference should be made to FIG. 6 and FIG. 7, which show a sectional view taken along lines 6,7 of FIG. 4 to reveal the position of the flow limiters under different conditions.

FIG. 6 shows the flow limiters 40 and 41 in a flow limiting condition. In the flow limiting condition flange 81 obstructs the fluid flow through ports 45 and flange 81*a* obstructs the fluid flow through ports 46. In contrast, FIG. 7 shows the flow limiters 40 and 41 in a deactivated condition. In the deactivated condition fluid can flow past flange 81 and through ports 45 as well as past flange 81*a* and through ports 46. In the flow limiting condition, as shown in FIG. 6, the flange 81 of flow limiter 40, has been axially displaceable in socket 50 to block the apertures 45 and limit or prevent flow therethrough since the flow limiter 40 has a flange 81 having a diameter larger than a diameter of the set of fluid ports in the end cap 50*b*. Similarly, the flow limiter 41 has been axially displaceable in socket 51 to block the apertures 46 and limit or prevent flow therethrough since it has a flange having a diameter larger than the diameter of the set of fluid ports in the end cap 51*b*.

FIG. 6C is a perspective-isolated view of a one-piece flow limiter 40 for limiting or obstructing the fluid flow through a dispensing valve in response to a fluid condition within the dispensing valve. As flow limiter 40 and flow limiter 41 are identical only flow limiter 40 is described herein. Flow limiter 40 includes a flat circular flange or disk 81 with a central cylindrical stem 83 extending vertically upward from the center of flange 81. The stem 83 allows the flow limiter 40 to move up and down in a hole in the socket bottom while the stem is radially restrained by the sidewalls 50*f* of a hole 50*d* in an the end cap or socket web 50*b* of socket 50 (FIG. 6D). Stem 83 contains a split head 84, 85 with a first split head 84*a* having a retaining barb 84*a* and a second split head 85 having a retaining barb 85*a*. Split head 84 and split head 85 are resilient and can be pinched together to facilitate insertion of the stem 83 into an opening 50*d* in web or end cap 50*b*. Once inserted the split head ends 84 and 85 are allowed to expand causing barb 84*a* and barb 85*a* to act as a top stop to thereby retain the flow limiter 40 in the socket of the converter 30. Similarly, disk 81 functions as a bottom stop to retain the flow limiter 40 in the socket of the converter 30. While the purpose of the split stem is to facilitate insertion of the stem into an opening in the socket bottom other means or methods may be used to insert or restrain axial displacement of a flow limiter.

A feature of the converter 30 is that during operation of dispensing valve 10 the dispensing cartridges within the dispenser mechanically maintain the flow limiter 40 and the flow limiter 41 in a deactivated condition to allow fluid from the dispensing valve 10 to flow into and out of the dispensing cartridges, which are located in chamber 20 in the dispensing valve 10 and mate with the converter. However, removal of the mateable dispenser cartridges from the dispensing valve 10 automatically activates the flow limiter 40 and flow limiter 41 through utilization of the water pressure in the dispensing valve which urges the flow limiter 40 and flow limiter 41 to a closed condition that limits or prevents backflow into an open chamber of the dispensing valve. A benefit of the integral activation and deactivation feature is that if a consumer should accidentally remove a dispensing cartridge from the dispensing valve without shutting off the water pressure the flow limiters automatically limit or prevent backflow of water into the chamber of the dispensing valve thus minimizing chances of a water spill or injury to the person.

FIG. 6A shows a partial sectional view showing converter 30 bridged across the chamber 20 to reveal the frictional cooperation between the dispenser housing sidewall 10*a* and converter 30. That is, the peripheral frictional engagement of the edge of radial fins 31*a* with the inner sidewall 10*a* limits lateral and axial displacement of the converter 30. In addition converter socket 35 extends into dispenser socket 19*a* on dispensing valve 10 so that outer sidewall 35*a* of converter socket 35 is in mating engagement with inner sidewall 19*c* a of dispensing valve socket 19*a* which extends vertically upward from the bottom of dispenser 10. Similarly, converter socket 36 extends into dispenser so that outer sidewall 36a of socket 36 is in mating engagement with inner sidewall 19d of socket 19b to limit or prevent flow leakage therebetween. The mating engagement between sockets of the converter and the sockets of the dispensing valve is preferably a frictional fit along the entire peripheral region of the sockets to provide a flow path for water to flow through the dispenser sockets and the converter sockets before entering chamber 20 which contains a set of dispensing cartridges.

A feature of converter 30 is that it can be hand mounted in an existing dispensing valve without the aid of tools and without having to alter the internal structure of the dispensing valve solely through frictional engagement between the dispensing valve and the converter although other methods may be used without departing from the spirit and scope of the invention. A reference to FIG. 6B shows a detail of a radial fin 31 revealing an angled peripheral edge 31b of radial fin 31a in biting engagement with sidewall 10a. The radial fin 31a is cantilevered from hub 31 of converter 30 with the peripheral edge 31b of the radial fins engaging the sidewall at an acute angle $\Theta$. The radial fin is also an acute angle $\phi$ with respect to plane 37 which extends through an edge 31a of the radial fins 31 of the converter (FIG. 5) so that the end face 31b (FIG. 6B) is located at an acute angle to the sidewall with a sharp corner or angled edge 31b in contact with the side wall. The use of an angled edge 31b for engaging the sidewall 10a increases the frictional resistance to removal of the converter from the inline dispenser. In addition the location of the fin 31 at an acute angle $\Theta$ with respect to the sidewall 10a allows the fin 31a to flex with respect to the hub 31 as the hub is forced downward into the dispenser. The flexing allows the fins 31a to accommodate an inside housing 10 where the diameter of the housing may vary since the fin 31a can flex to cause the fin edge 31c to bite into the sidewall 10a. While the peripheral edge 31a is shown as comprising a set of radial fins 32 the radial fins may be omitted as illustrated in the converter 210. In the example shown in FIG. 5 and FIG. 6 the end face 31c of the fins is perpendicular to fin 31a so that the slight upward acute angle of fin 31a with respect to plane 37, as illustrated in FIG. 5 and FIG. 6 and FIG. 6B causes edge 31b to engage the wall 10a. A feature of the angled fin 31a is that it inhibits or prevents removal of converter 30 since upward force on converter 30 increases the friction forces since the upward force to increase in diameter thus increasing the binding of the converter to the housing.

While a frictional mating engagement between the dispensing valve 10 and the converter 30 generates sufficient frictional resistant to maintain the converter 30 within a dispensing valve one may want to taper the sidewalls of the sockets of either the dispenser or the dispensing cartridges to facilitate starting engagement between the sockets as the converter is inserted into the inline dispenser. Still in other cases one may want the mating engagement between the converter and the dispensing valve to be the result of an interference fit between the sockets in the converter and the sockets in the inline dispenser.

A reference to FIG. 6 shows an isolated view of the converter 30 with flow limiter 40 and flow limiter 41 in the flow limiting condition and FIG. 7 shows and isolated view of the converter 30 with the flow limiter 40 and flow limiter 41 in the non-flow limiting condition.

A reference to FIGS. 8-12 reveals the converter and the converter mateable dispensing cartridges for insertion in a dispensing valve and the steps of an operator in first inserting a converter into a dispensing valve and then inserting mateable dispensing cartridges into the dispensing valve as well as the effect of the step of inserting or removing a mateable dispenser cartridge from the dispensing valve. The conventional step of inserting mateable dispensing cartridges into the converter automatically changes the flow limiters in the converter from a flow limiting condition to a non flow limiting condition while the conventional step of removing the mateable dispenser cartridges from the converter automatically changes the flow limiters in the converter from a non flow limiting condition to a flow limiting condition. In both instance the operation of changing the flow limiter condition from one state to another is seamless and requires no special action by the pool owner.

FIG. 8 shows the first step (indicated by the arrows) of mounting a converter 30 with flow limiters in a dispensing valve 10 through frictionally engagement between the converter fins 31a and the sidewall 10a as well the engagement of the converter socket 35 with a first extension socket 19b of the dispensing valve 10 and the second extension 19a (located behind extension 19b).

FIG. 9 is a side view partially in section showing the second step where the converter 30 has been frictionally engaged with sidewall 10a as well as mateinngly engaged with the dispensing valve extension water socket 19b and extension water socket 19a (FIG. 3).

Figure 11:
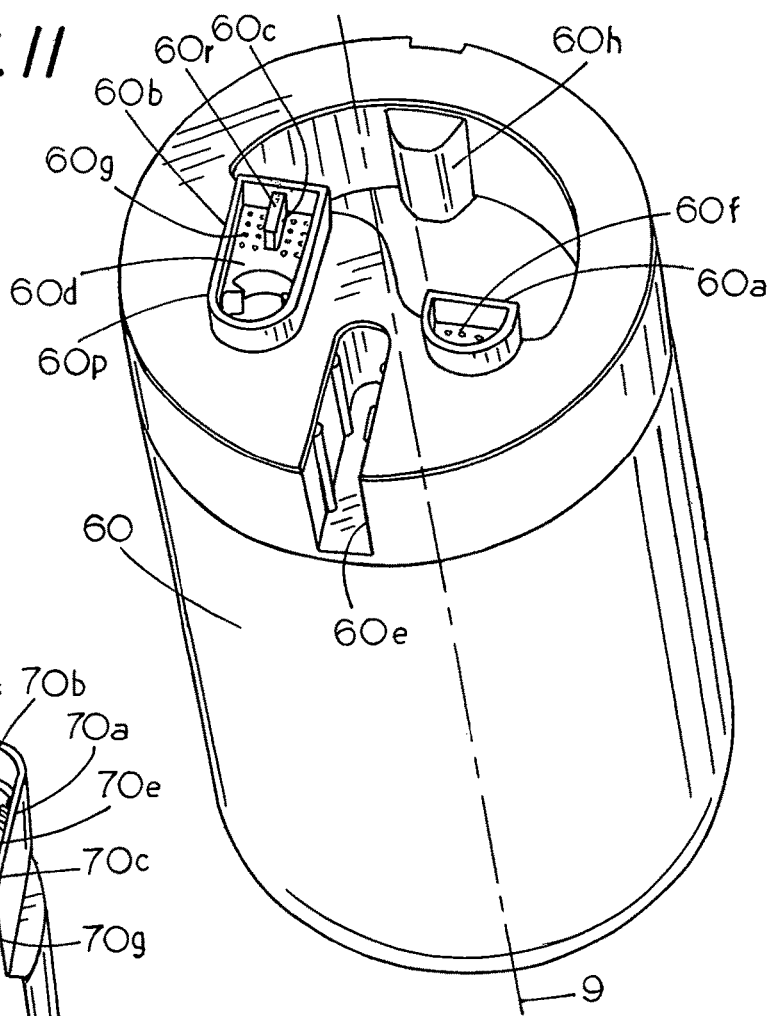
FIG. 11 is a pictorial end view of an annular dispensing cartridge having a deactivator for engaging the flow limiter in the converter.
Figure 11A:
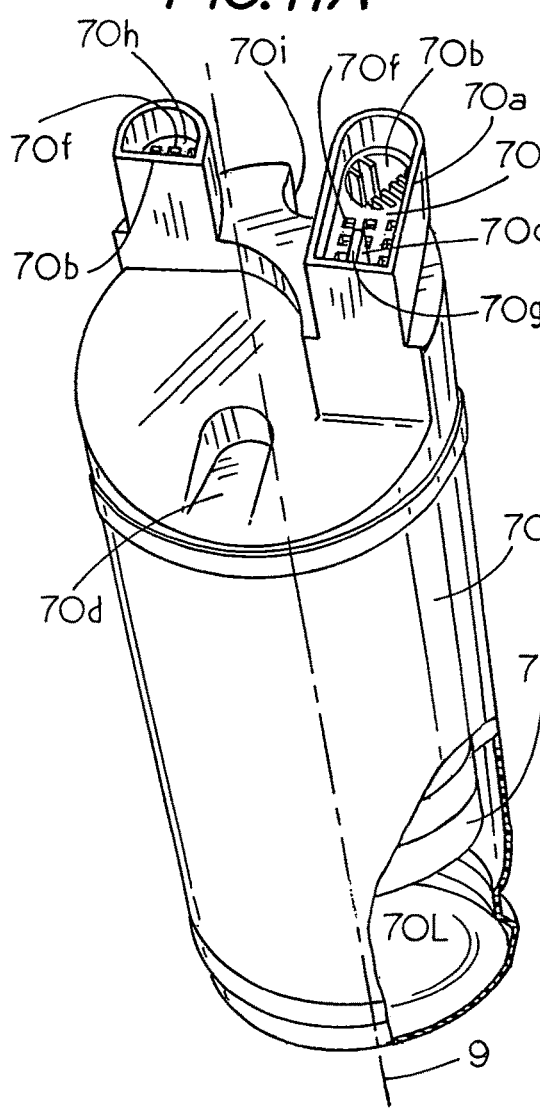
FIG. 11A is a pictorial end view of a cylindrical cartridge having a deactivator for engaging the flow limiter in the converter.

FIG. 10 is a side view partially in section showing the third step where a set of nested dispensing cartridges 60 and 70, which are mateable with the converter 30, are in the process of being inserted into the top sockets of the converter 30, which is mounted on the extension sockets of the dispensing valve 10. FIG. 11 and FIG. 11A show isolated views of nested dispensing cartridges 60 and 70 that contain features that seamlessly deactivate the flow limiters 40 and 41 in the converter 30.

Figure 12:
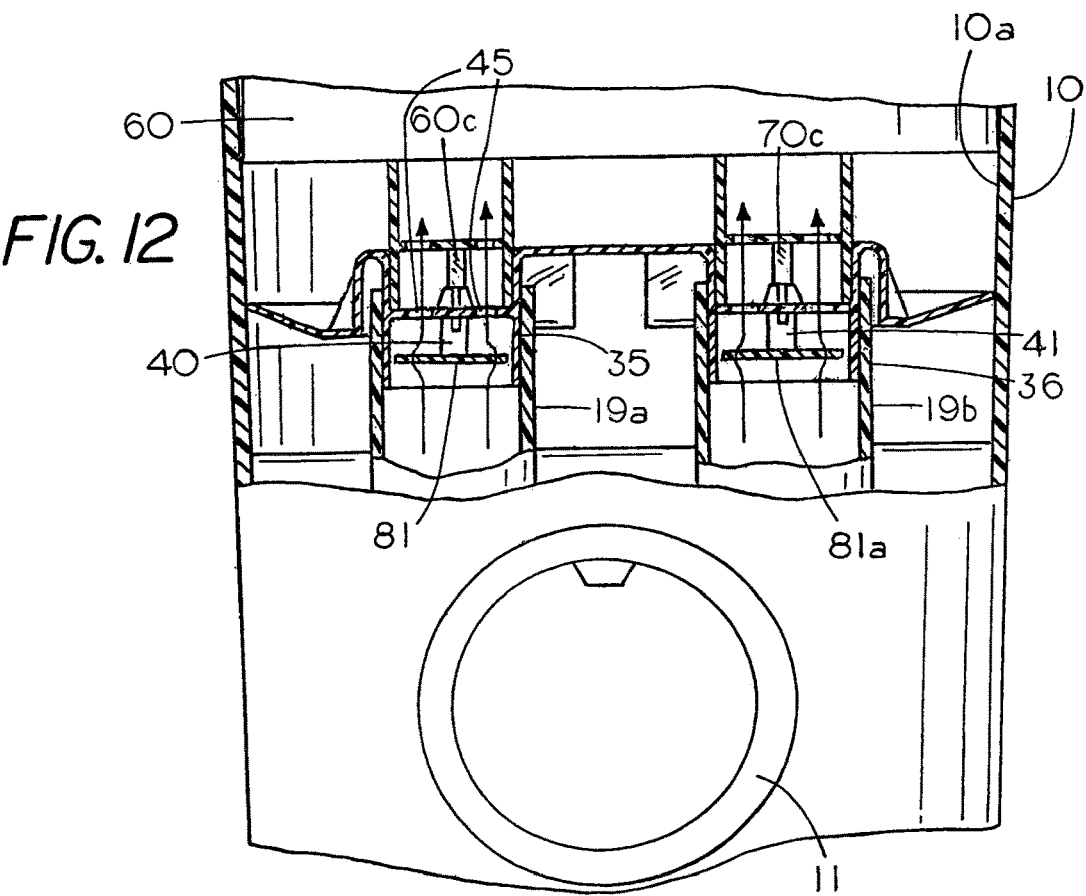
FIG. 12 is a sectional view showing flow limiters in a deactivated condition.

FIG. 11 is a pictorial end view of an annular dispensing cartridge 60 for insertion into dispenser 10. To facilitate correct insertion, the dispensing cartridge 60 includes an alignment slot 60e for rotational alignment of the dispenser cartridge 60 with respect to the dispensing valve housing as well as alignment of a first socket 60a having a set of fluid ports 60f with a first dispensing valve socket and a second socket 60b having a set of fluid ports 60g for alignment with a second dispensing valve socket. Located in cartridge socket 60b is a deactivator cam 60c. In this example cam 60c comprises a rigid, rectangular shaped, rib that extends axially outward from end cap 60d of cartridge socket 60b. FIG. 12B shows that the height h of cam 60c is less than the height L of a portion of sidewall 60b that extends below socket 60. The deactivator cam 60c extends in a same direction as the axis of insertion of the flow limiter 40 in the converter 30. Consequently, the step of axially inserting the cartridge 60 into the dispenser 10 can be used to deactivate the flow limiter 40 as cam 60c forces the flow limiter 40 from the flow limiting condition shown in FIG. 12A into the non-flow limiting condition shown in FIG. 12 and FIG. 12B. On the other hand the action of removing the dispensing cartridge 60 from the dispensing valve activates the flow limiter 40 since cam 60c is removed from contact with the flow limiter 40 thus allowing the water pressure within the dispensing valve to bring the flow limiter 40 into the flow limiting position illustrated in FIG. 12A.

Through the insertion of a dispenser cartridge 60 with a cam 60c having a top cam face 60r into a dispensing valve one simultaneously and automatically deactivates the flow limiter 40 as the dispenser cartridge 60 is installed in an inline dispenser. A benefit of this feature is that a pool maintainer need not change his or her procedure for replacing dispensing cartridges since the act of replacing the dispensing cartridge automatically deactivates or activates the flow limiter 40. Consequently, opportunity for errors in replacing a dispensing cartridge are not affected by the operator. In fact the pool maintainer need not be aware of the deactivator cam 60c as the flow limiter is positioned so that the alignment of the socket of the dispensing valve with the socket in either of the converter or the dispensing valve automatically aligns the cam face 60r of deactivator cam 60c with the end of flow limiter 40 as illustrated in FIG. 12B. Consequently, the primary action of insertion or removal of a dispensing cartridge from a dispensing valve seamlessly controls the operation of the flow limiter. Consequently, the pool maintainer need not take any additional action to activate the flow limiter since the axial removal of the dispenser cartridge 60 automatically activates the flow limiter 40 as the deactivator cam 60c is withdrawn from contact with the stem head 84, 85 of flow limiter 40, which frees the flow limiter 40 to respond to fluid conditions within the system. Thus, a pool maintainer automatically activates or deactivates a flow limiter through the action of replacing a dispensing cartridge in the dispenser.

When the dispensing cartridge 60 is removed from a dispensing valve cam 60c activates the flow limiter 40 and when the dispenser cartridge 60 is inserted into the dispensing valve 10 cam 60c deactivates the flow limiter. In the example shown the deactivator cam 60c is fitted within dispenser socket 60b and is positioned so that deactivator cam face 60r (FIG. 12B) contacts the end of the flow limiter 40 to hold the flow limiter in an out of the way condition when the dispensers cartridge 60 is located in an operable condition in the dispensing valve. In this example the deactivator cam 60c comprises a rigid rectangular shaped extension or rib that extends outward from the bottom of socket 60d having a cam face 60r with the cam side 60h and cam side 60c alignable with flow therepast.

FIG. 11A is a pictorial end view of a canister or cylindrical dispensing cartridge 70 having a chamber 70L for holding a dispersant 70m, for example chlorine or bromine or other types of water treatment materials containable in a dispensing cartridge. Dispensing cartridge 70 has a central axis 9 with dispensing cartridge 70 nestable within dispensing cartridge 60 as illustrated in FIG. 10. Dispensing cartridge 70 also includes a deactivator cam or rib 70c for deactivating a flow limiter, which may be located in either a converter or a dispensing valve, when the dispensing cartridge 70 is inserted into the dispensing valve and activating the flow limiter when the dispensing cartridge 70 is removed from the dispensing valve. In this example dispensing cartridge 70 includes an alignment slot 70i and 70d for rotational alignment with dispensing cartridge 60 so that both dispenser cartridges 70 and 60 can be aligned for placement in the dispensing valve. Dispensing cartridge 70 includes a first socket 70a having a bottom or end cap 70e with a set of fluid ports 70f therein for ingress water into the cartridge 70 and a second socket 70b having a bottom or end cap 70h with a set of fluid ports 70f for egress of water from cartridge 70. In this example the deactivator cam 70c also comprises a rectangular shaped extension or rib, which is permanently mounted to the end cap 70e with the rib 70c extending axially outward from end cap 70e of socket 70a and having a cam face 70g for engaging and deactivating a flow limiter.

Figure 11B:
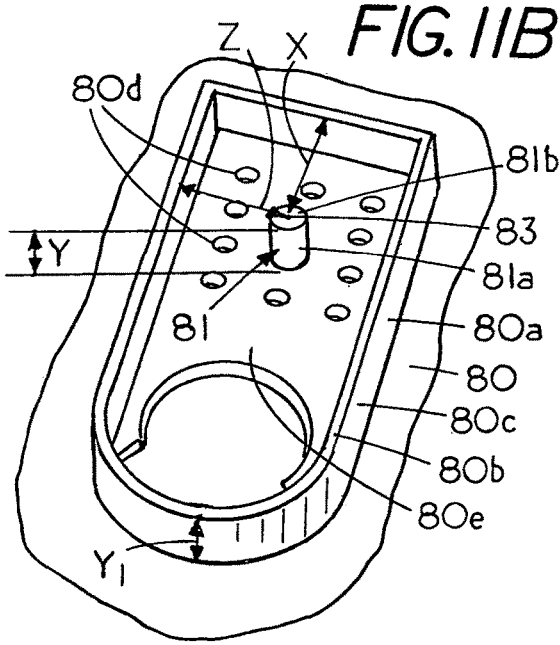
FIG. 11B is an isolated pictorial view of a cam located in a socket of a dispenser cartridge.

FIG. 11B is an isolated pictorial view of an example of a low profile deactivator 81a, which is located in socket 80a on a dispenser cartridge 80. In this example socket 80a has a top edge 80b for engaging an end cap of a socket in either a converter or a dispensing valve and an external mateable side 80c for engaging a sidewall of a socket in either a converter or a socket in a dispensing valve. An end cap 80e extends across the bottom of socket 80a with one end of end cap 80e including a set of fluid ports 80d for flow of fluid therethrough. Extending outward from end cap 80e is the deactivator 81a, which comprises a cylindrical post having a cylindrical sidewall 81a and a top circular cam face 81b having a geometric center 83. In this example cam face 81b can be used to deactivate a flow limiter when the dispensing cartridge 80 is inserted into a socket in either a dispensing valve or a converter. The deactivator 81 has a height y which is less than the height $y_1$ of the sidewall 80c, which allows one to align the socket of the dispensing cartridge with either the socket of a converter or a dispensing valve before the deactivator 81 contacts the flow limiter which is carried in a socket of either the converter or the dispensing valve. In this example the deactivator 81 is positioned with respect to the socket sidewall 80b as noted by the dimensions x and z that are measured from a central axis 83 of deactivator 81. In order to provide for cam engagement during and after insertion of the dispensing cartridge into the dispensing valve the flow limiter in the converter or the dispensing valve is also positioned with respect to a sidewall socket of the converter or the dispensing valve that mates with the socket of the dispensing cartridge. Although the dispensing cartridges and the dispensing valve are separate components the referencing of the position of the deactivator 81b with respect to a socket sidewall which forms mating engagement with a socket sidewall on a converter or the inline dispenser, allows one to locate the deactivator 81 so that the insertion of the dispensing cartridge 60 into the socket of a dispensing valve or a converter automatically brings the deactivator 81 into alignment and engagement with the flow limiter since the flow limiter is dimensionally positioned with respect to the socket sidewall carrying the flow limiter.

Figure 12A:
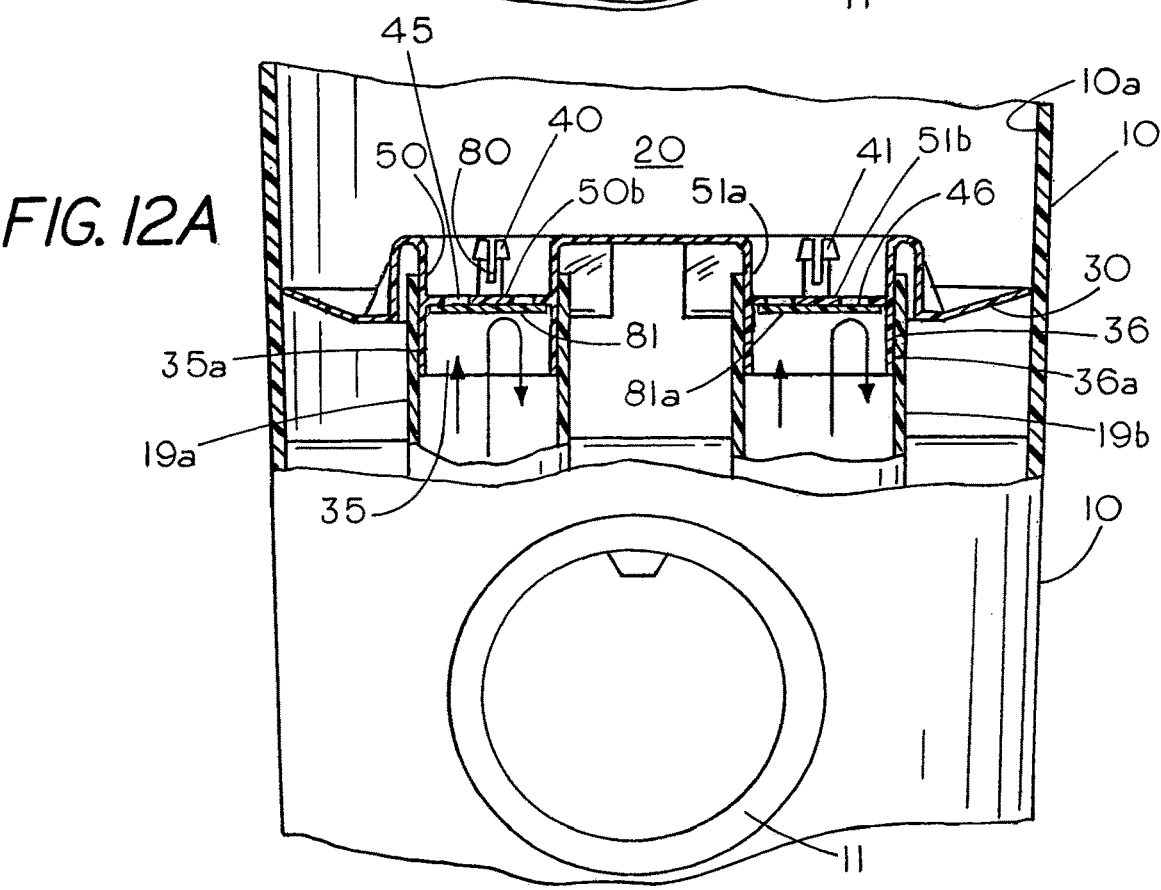
FIG. 12A is a sectional view showing flow limiters in an operative condition.
Figure 12B:
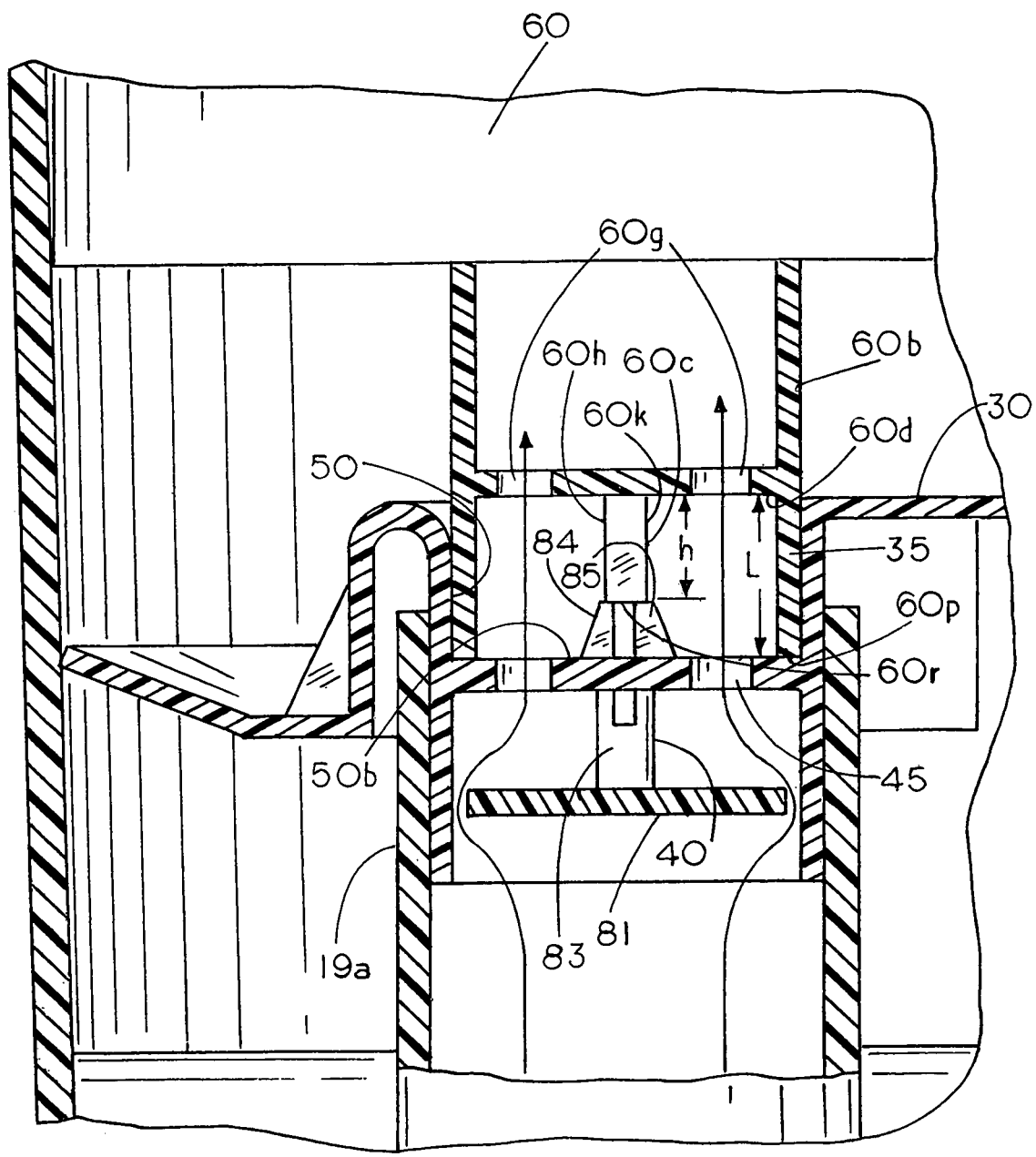
FIG. 12b is an isolated view of the extensions sockets of the dispenser and the dispensing cartridge in mating engagement with the flow limiter deactivated by the dispensing cartridge.

A reference to FIG. 12A shows converter 30 located in dispensing valve 10 with the dispensing cartridges having been removed from the dispensing valve 10. In this example the inlet water socket 19a connects to a source of pressurized water (not shown). During replacement of a dispenser cartridge the source of pressurized water in the dispensing valve 10 an operator normally closes the rotor valve 15 (FIG. 1) to stop flow into the chamber of the dispensing valve, however, in the event an operator fails to close the rotor valve 15 the invention described herein provides a safety feature that automatically limits or prevents backflow of water into the dispensing chamber in the dispensing valve 10 when the dispensing cartridges are removed from the dispensing valve.

As can be seen in FIG. 12 the sockets of converter 30 mate to the sockets of the dispensing valve 10. That is, the dispensing valve water socket 19a is in mating engagement with bottom converter socket 35 and dispensing valve water socket 19b is in mating engagement with bottom converter socket 36. In the mated condition and without the presence of a canister or dispenser cartridge the fluid pressure in socket 19a generates an upward force on flow limiter 40 causing the flow limiter 40 to move axially upwards and block the ports 45 (FIG. 12A) with flange 81 thus limiting or preventing fluid flow into the dispensing chamber 20. Similarly, fluid pressure in socket 19b generates an upward force on flow limiter 41 causing the flow limiter to move axially upward and block the ports 46 (FIG. 12A) with flange 81a thus limiting or preventing fluid flow into the dispensing chamber 20. Through utilization of the internal fluid pressure within the dispenser one can urge the flow limiters 40 and 41 to a flow-limiting mode thus reducing the chances that the water in the dispensing valve can escape the dispenser during a replacement of one or more of the dispensing cartridges.

Thus, in normal operation of the dispenser 10 a dispensing cartridge or cartridges are located in the chamber 20 of the dispensing valve. A set of deactivator's 60*c* and 70*c* on the dispensers normally hold the flow limiter 40 and the flow limiter 41 in an open or non-flow limiting condition. However, if a cartridge should be removed to be replaced when the dispensing valve contains fluid under pressure the flow limiters are automatically displaced axially upward to block the ports in the sockets of the converter (FIG. 12A).

To retain the flow limiter in an operative condition within the converter 30 the opening 50*d* (FIG. 6D) in the bottom socket member 50 is larger than the diameter of the stem 83 but less than the diameter of the stem at the barb which enables the flow limiter 40 to move axially up and down within sidewall 50*f* in response to a water condition in the dispensing valve 10. Typically, the flow limiter 40 is made from a polymer plastic or the like with the weight of the flow limiter such that the water pressure forces the flow limiter 40 to move upward with flange 81 sealingly abutting against the underside of end cap 50*b* (FIG. 12A) thereby shutting off or limiting flow through the openings 45 in socket end cap 50*b*. Similarly, the flow limiter 41 is made from a polymer plastic or the like with the weight of the flow limiter such that the water pressure forces the flow limiter 41 with flange 81*a* to move upward to sealingly abut against the underside of end cap 51*a* (FIG. 12A) thereby shutting off or limiting flow through the openings 46 in socket end cap 51*b*. Thus in the flow limiting condition the flow limiter 40 and 41 are allowed to be responsive to water pressure in the dispensing valve while in the non flow limiting condition the flow limiters are not responsive to water pressure in the dispensing valve.

Typically, converter 30 can be quickly installed into the sockets at the bottom of an existing inline non-flow limiting dispensing valve to provide an on-the-go conversion to a flow-limiting dispensing valve. In the installed condition an inner side wall 50*a* of a top converter socket 50 and an inner sidewall 51*a* of top converter socket 51 engage the outer side wall of mating sockets which are located on dispensing cartridges that are installed in the dispensing valve. In addition the radial fins 31*a* on the converter 30 engage the inner surface 10*a* to frictional maintain the converter 30 in an operative condition within the dispensing valve 10.

FIG. 12 shows the deactivator 60*c* holding the flow limiter 40 in a deactivated condition with deactivator 70*c* holding flow limiter 41 in a deactivated condition to allow fluid to bypass the flow limiters and flow into the dispensing cartridges 60 and 70.

Reference to FIG. 12B shows an isolated view of a portion of a dispensing cartridge 60 having a cam face end 60*r* of a deactivator 60*c* in contact with an end 84, 85 of flow limiter 40 to maintain the flow limiter 40 in a bypass condition where the flow of water into and out of the dispensing cartridge 60 can be maintained. The dispensing cartridge socket 60*b* is in mating engagement with the top converter socket 50 with the web or end cap 50*b* of socket 50 in engagement with edge 60*p* of dispensing cartridge 60. In this condition the deactivator 60*c*, which extends a distance h from the socket bottom 60*d*, holds the flow limiter 40 in a non-flow limiting position i.e. a deactivated condition. The height h of the deactivator is such that in a condition where the cartridges are present in the dispenser the deactivator 60*c* abuts the head 84,85 of the stem 83 to hold the flow limiter 40 in a condition that permits flow around the disk seal 81 and through the ports 45. The axial alignment of the deactivator 60*c* and the stem 83 allows the action of inserting the dispensing cartridge 60 into the converter 30 to automatically deactivate the flow limiter 40. That is, the deactivator 60*c* contacts the top end 84, 85 of stem 83 as one pushes the dispensing cartridge into a dispensing position in the inline dispenser. More specifically, the cam face 60*r* of deactivator 60*c* pushes the stem 83 of the flow limiter 40 downward to the position shown in FIG. 12B. Once in position the deactivator 60*c* holds the flow limiter 40 in a deactivated condition i.e. disk 81 in a spaced condition from the web or end cap 50*b* of socket 50 thereby allowing flow into canister 60 through ports 45 and 60*g*. As illustrated by the arrows in FIG. 12B the fluid flows around the disk 81 and through the openings 45 and the openings or ports 60*g* and into the dispenser cartridge 60 where the water can come into contact with the dispersant therein. Thus when the flow limiter 40 is in a passive or deactivated condition water bypasses the flow limiter 40 allowing water to come into contact with the dispersant in the dispensing cartridge 60.

Figure 13:
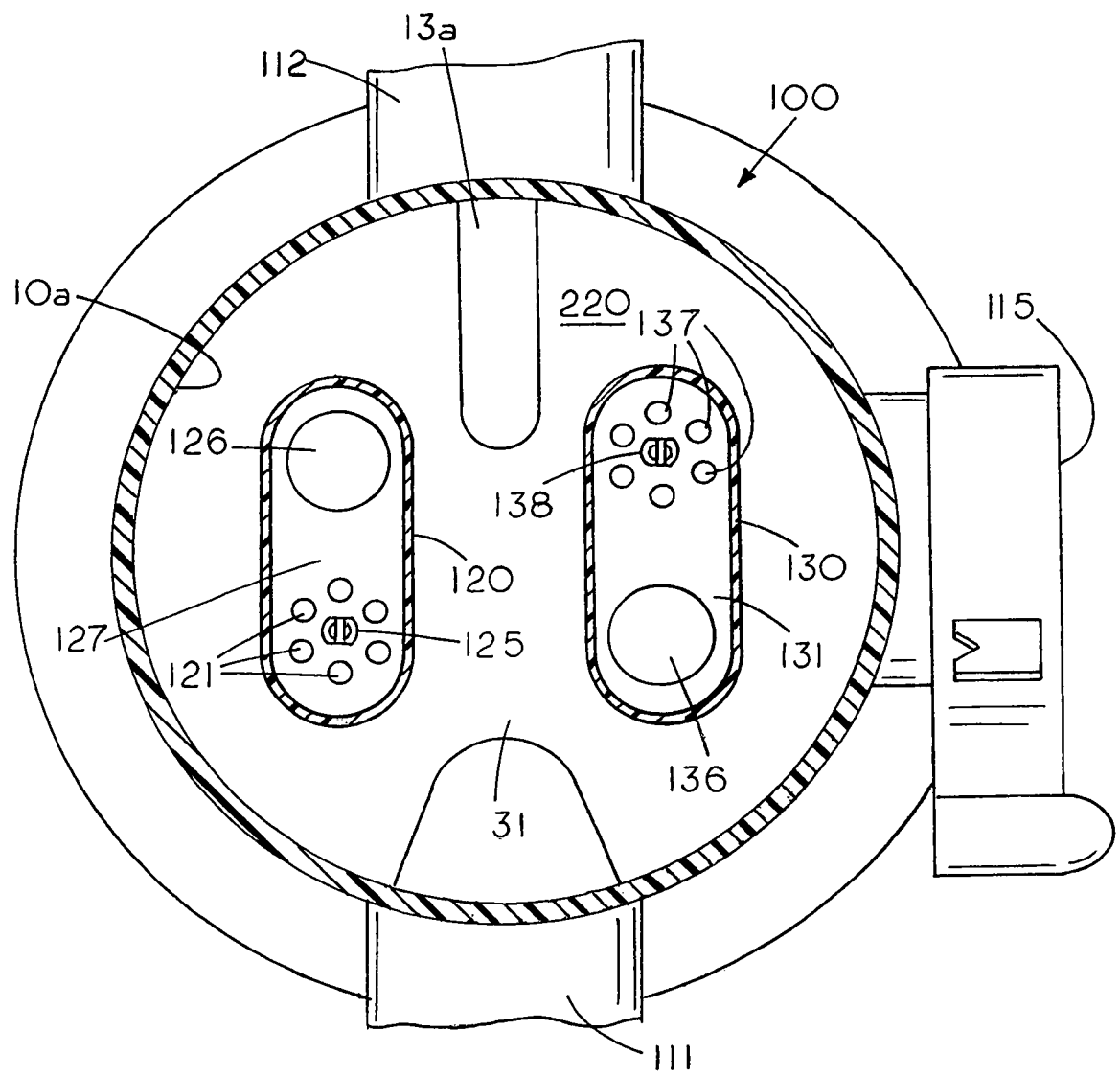
FIG. 13 is a sectional view showing the flow limiters as integral part of an inline dispenser.

FIG. 13 shows an alternate embodiment of the invention wherein flow limiters 125 and 138 are incorporated directly into an inline dispensing valve 100 and become an integral part of the dispensing valve. Flow limiters 125 and 138 are identical to flow limiter 40 shown in FIG. 6C however, in this example the flow limiters are located in sockets of the dispensing valve rather than sockets in the converter. In this example the dispensing valve 100 includes inlet housing 111 to direct water into the dispenser 100 and an outlet housing 112 that directs water out of the dispenser 100. A rotor valve 115 allows one to select the amount of water to flow through the dispenser and consequently the dispensing rate of the dispersant in the dispensing canisters, which would be located in chamber 220 of dispenser 100. In the example shown the dispensing valve socket 120 includes a bottom member or end cap 127 having a return port 126 and a dispenser cartridge inlet port comprised of a set of openings 121 that are circumferentially positioned around the flow limiter 125. Similarly, the dispensing valve socket 130 includes a bottom member or end cap 131 having a return port 136 and a dispenser cartridge inlet port comprised of a set of openings 137 that are circumferentially positioned around the flow limiter 138. The flow limiters 125 and 138 are identical in operation to flow limiters 40 and 41 and automatically limit or prevent water flow into the dispenser chamber 220 when either or both of the dispensing cartridge are removed from the dispensing chamber 220 and are deactivated when dispensing cartridges are present in dispensing chamber 220 to thereby let water flow into the dispensing cartridges. A benefit of the invention of FIG. 13 is that it eliminates the need for an insertable converter since the flow limiters can be incorporated directly in the dispensing valve sockets 120 and 130.

A feature of the invention is that the flow limiters can block the flow upstream of the dispenser cartridges with the deactivation and activation of the flow limiters determined by the location of the dispensing cartridges with respect to a dispensing valve.

A feature of the invention described herein includes a pool operators ability to on-the-go resize a dispensing valve such as an inline dispenser shown in FIG. 3, to enable the dispensing valve to operably receive one or more different size dispensing cartridge without having to alter or modify the internal structure of the inline dispenser. To operably receive is understood to mean that the dispenser cartridges within the dispensing valve function in a normal dispensing manner whereby water flows into and out of the dispenser cartridge during the delivery of a dispersant or dispersants to a body of water.

Thus the invention of resizing as illustrated in FIG. 12 and FIG. 3 includes the method of on-the-go reconfiguring a dispensing valve 10 that operably receives a first dispenser cartridge to operably receive a second dispenser cartridge 60 where a water socket 50 of the first dispensing cartridge is a different size than a water socket of the second dispensing cartridge 60. The on-the-go resizing comprises the step of removing a first dispensing cartridge from engagement with a water socket in the dispensing valve (not shown) followed by inserting a converter 30 having a top socket 50, a top socket 51 a bottom socket 35 and a bottom socket 36 into a chamber 20 in the dispensing valve 10.

Next, one frictionally engages a bottom socket 35 and a bottom socket 36 of the converter 30 with the water socket 19*a* and the water socket 19*b* of the dispensing valve 10. One can then insert the second dispensing cartridge 60 into the dispensing valve 10 and frictionally engage sockets 60*a* and 60*b* of the second dispensing cartridge with the top sockets of the converter.

Additional features may include the step of resiliently engaging a set of radial fins 31*a* on the converter 30 with a sidewall 10*a* of the dispensing valve 10 to maintain the converter 30 within the dispensing valve through frictional engagement therebetween. While the method has been described in relation to insertion of a single dispenser cartridge into the dispensing valve, the drawing illustrates that two dispenser cartridges each having separate water sockets can be mated with additional sockets in the converter and the dispensing valve.

In the example shown in FIG. 3 the converter 30 was mounted in the dispenser housing followed by the insertion of the dispensing cartridges into the converter 30. A feature of the invention described herein is that the converter 30 may be first attached to the dispensing cartridges 60 and 70 as illustrated in FIG. 14 and FIG. 15. FIG. 15 is a partial sectional view showing a set of dispensing cartridges 60 and 70 with a converter 30 attached to the sockets 60*b* and 70*b* of dispensing cartridges 60 and 70. The sectional view of the converter 30 is taken along lines 6,7 as shown in FIG. 4 so as to reveal both of the flow limiters in the converter 30. By attaching the converter 30 to the inline dispensing cartridges one can further facilitate an upgrade of the dispensing system. That is, if cartridges 60 and 70 are attached to the converter 30 the user need only take one step to upgrade the dispenser since the insertion of the dispensing cartridges 60 and 70 with the attached converter 30 into the dispensing valve will also bring the converter 30 into an operative condition within the inline dispenser.

A further feature of this embodiment is that the peripheral edge of the converter can securely fasten the converter 30 to the dispensing valve through frictional engagement therebetween while the axial removal of one or both of the dispensing cartridges 60 or 70 from a dispensing valve can be used to separate the dispensing cartridges 60,70 from the converter 30. That is, the force of attachment of the dispensing valve cartridges 60,70 to the converter 30 is less than the force required to remove the converter 30 from an inline dispersal valve. Consequently, one may remove spent cartridges while leaving the converter in place to receive a set of fresh cartridges.

While FIGS. 1-15 show a converter for use in dispensing valves such as inline dispensing valve that contain a set of nested containers FIGS. 16-24 show a bulk feeder converter and a set of dispensing cartridges for on the go converting a dispensing valve such as bulk feeder into a cartridge feeder. While the term inline dispensing valves includes both bulk feeders and inline dispersal valves that deliver dispersants through fluid action the existing bulk feeders generally lack sockets for direct engagement to a dispenser cartridge since the bulk feeders are intended to receive a dispersant in a bulk or loose condition without a cartridge supporting the dispersant. The dispensing valve used in conjunction as described herein may be either an inline dispensing valve, an off line dispensing valve a bulk feeder dispensing valve although other types of dispensing valves may benefit from the inventions described herein.

FIG. 16 is an exploded view of a dispensing system with a set of nesting dispensing cartridges 220 and 221, a bulk feeder converter 210, a set of flow limiters 230 and 231 and a bulk feeder having a frusto conical chamber 202 for receiving the cartridges, the converter and the flow limiters. A cover, not shown, is secured to the top of the bulk feeder to contain the cartridges, converter and flow limiters within the chamber 202. Dispensing cartridge 221 of FIG. 16 and dispensing cartridge 70 of FIG. 11 are identical as well as dispensing cartridge 220 of FIG. 16 and dispensing cartridge 60 of FIG. 11. The dispensing cartridges are normally mounted in a nested relationship in a dispensing valve as shown and described in U.S. Pat. No. 6,210,566.

FIG. 17 is an isolated view showing bulk feeder converter 210 about to be axially inserted into a frusto conical chamber 202 of bulk feeder 200, which has a larger diameter $D_2$ at the top of the bulk feeder than the diameter $D_1$ at the bottom of the bulk feeder as illustrated in FIG. 16. Once the converter is inserted the converging diameter of the chamber 202 allows the bulk feeder converter 210 to be pushed downward until the circular peripheral edge 210*a* frictionally engages the circular inner frusto conical wall 200*a* of bulk feeder 200 and the underside of the converter mates with the curvilinear lip 204 and curvilinear lip 205 on the bottom of the bulk feeder. In this example, the diametrical dimension of converter 210 is selected so that frictional engagement between the converter 210 and the sidewall 200*a* occurs when the curved undersides of the converter 210 mates with the curvilinear lip 204 and curvilinear lip 205 at the bottom of the bulk feeder with the curvilinear lip 204 and curvilinear lip 205 each defining regions of flow into and out of the chamber 202 of the bulk feeder. Consequently, through coordination of the diameter of the converter with the vertical height where the underside of the converter mates with the bottom of the bulk feeder one can simultaneously secure the converter in the bulk feeder and form a fluid pathway between the bulk feeder and the converter. In this example the sole action of axially forcing the bulk feeder converter 210 into the bottom of the bulk feeder chamber 202 frictionally retains the converter in the bulk feeder.

FIG. 17 illustrates the method of on the go reconfiguring a bulk feeder usable in either an industrial water treatment application or a nonindustrial water treatment application to a bulk feeder 200 for receiving a water dispersant contained in a dispenser cartridge comprising the steps of inserting a converter 210 having a peripheral edge 210*a*, a first top cartridge socket 210*d* and a first bottom socket 214 (FIG. 19) and a second top cartridge socket 210*e* and a second bottom socket 245 (FIG. 19) into a chamber 202 in the bulk feeder 200 and securing the converter 210 to the bulk feeder 200 through methods as illustrated in FIGS. 17*b* and 17*c* although other methods may be used without departing from the spirit and scope of the invention.

FIG. 17A shows converter 210 mounted in the bottom of bulk feeder 200 in a condition to receive a set of dispensing cartridges and engage the ports on the dispensing cartridge and FIG. 17B shows a detail of the frictional engagement of the circular peripheral edge 210a of converter 210 with the with the frusto conical sidewall 200a. In this example the combination of a slight taper of the frusto conical sidewall 200 allows the converter to be inserted into the chamber until the peripheral edge 210a of the converter contacts the sidewall 200a. Once contacted, a further downward axial force on the converter 210 causes the peripheral edge 210a of the converter to bite into the wall 200a as shown in FIG. 17b to thereby securely hold the converter in position to receive a cartridge. The frictional engagement between converter 210 and sidewall 200a is sufficient to permanently retain the converter 210 in the bulk dispenser 200. However, if desired an alternate method, which is shown in FIG. 17C, may be used. In this example of an alternate method an annular member 250 is adhesively secured to the portion of the sidewall 200a above the converter 210 to prevent withdrawal of the converter 210 from the bulk feeder. Bulk feeder 200 is typically used in the pool or spa industry. Other use of bulk feeders and bulk feeder converters are in within the scope of the present invention including feeders for treating industrial water, for example water used in cooling towers or the like. Thus the invention may be used in feeders useable in both industrial and nonindustrial water treatment applications without departing from the spirit and scope of the present invention.

Figure 18:
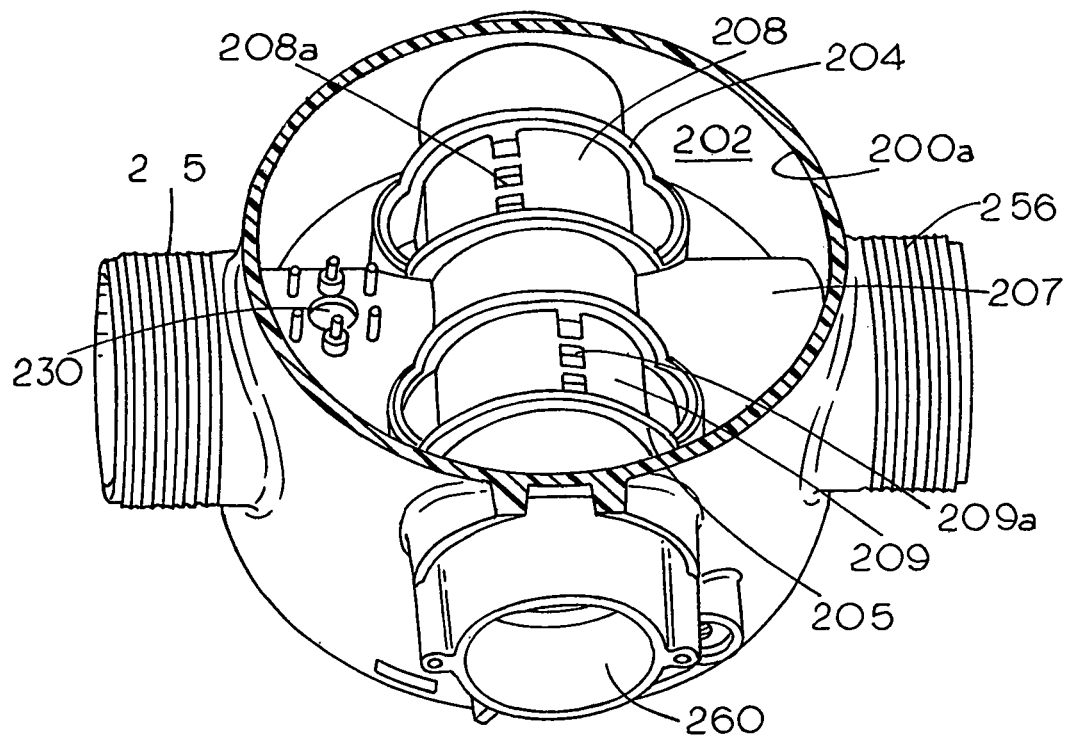
FIG. 18 is a sectional view showing the sockets and flow selector at the bottom of the bulk-dispensing cartridge.

FIG. 18 is a sectional perspective view of the bulk feeder 200 showing the interior bottom portion of bulk feeder 200. Bulk feeder 200 is similar to dispensing valve 10 shown in FIG. 3 but instead of having a set of sockets for engaging an inlet and an outlet in a set of canisters the bulk feeder 20 includes a bottom member 207 having a first curvilinear lip 204 encompassing a curvilinear web 208 with a fluid port 208a and a second curvilinear lip 205 encompassing a second curvilinear web 209 with a fluid port 209a therein. In one mode of operation water enters inlet fitting 255 and flows through inlet port 209a into the chamber 202 and then flows back into outlet fitting 206 through port 208a. The curvilinear webs with the ports therein prevent a solid dispersant such as halogen pucks or tablets of chlorine or bromine from falling into the fluid stream flowing from the inlet port 209a to the outlet port 208a of the bulk feeder 200. Since the pucks or tablets are larger than the ports the water has an opportunity to flow around and through the pucks or tablets before being discharged through outlet fitting 256. For purpose of clarity a rotary valve which would normally be located in circular housing 260 of the bulk feeder 200 has been left out. The purpose of the rotary valve is to increase or decrease the flow of water through the chamber 202 of the bulk feeder 200.

The set of curvilinear lips 204 and 205, which are located at the bottom of chamber 202, are suitable for forming mating engagement with features on the underside of converter 210.

Figure 19:
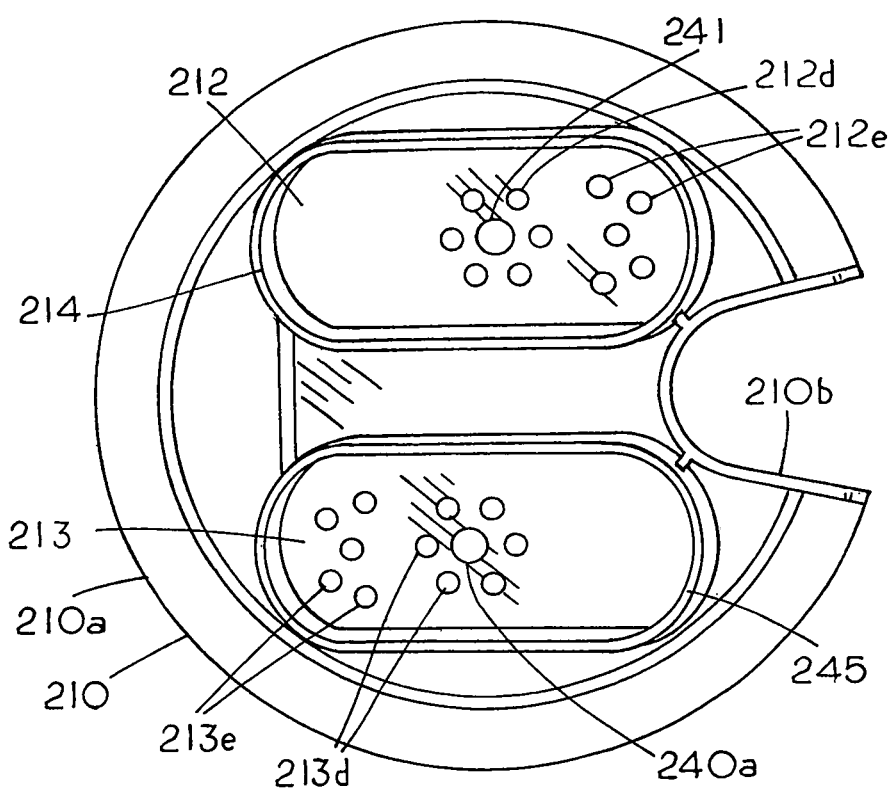
FIG. 19 is a bottom view of a bulk feeder converter.

FIG. 19 shows a bottom view of bulk feeder converter 210 revealing a cutout 210b for pressure relief valve 230 (FIG. 18) as well as a first curvilinear lip 214 with a web 212 therein and a curvilinear lip 245 with a web 213 therein. Located in web 213 is a first set of ports 213e and a second set of ports 213d which surround an opening 240a for receiving the stem of a first flow limiter. Similarly, located on web 212 is a first set of ports 212e and a second set of ports 212d which surround an opening 241 for receiving the stem of a second flow limiter. When the converter is positioned in the bulk feeder the converter curvilinear lip 214 mates with the curvilinear bulk feeder lip 204 and the curvilinear converter lip 245 mates with the curvilinear bulk feeder lip 205. In this example the peripheral edge 210a can be brought into mating frictional engagement with a sidewall 200a while the curvilinear converter lip 214 is brought into mating face-to-face engagement with curvilinear bulk feeder lip 204 and the curvilinear converter lip 205 is brought into mating face-to-face engagement with curvilinear bulk feeder lip 214.

Figure 20:
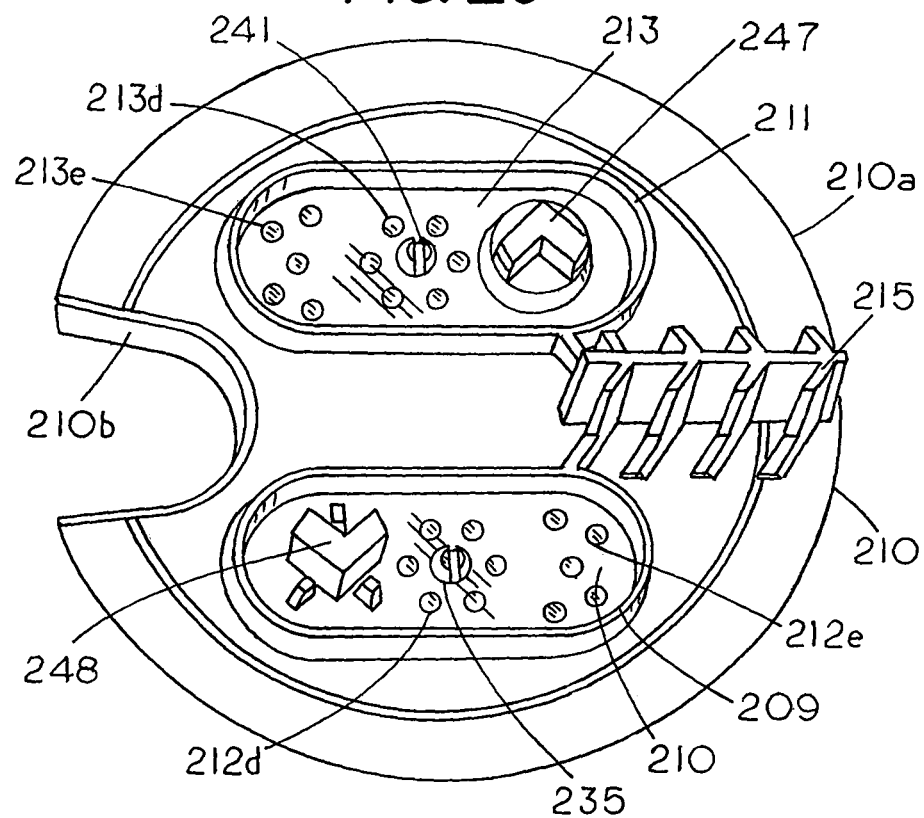
FIG. 20 is a top view of a bulk feeder converter of FIG. 19.
Figure 21:
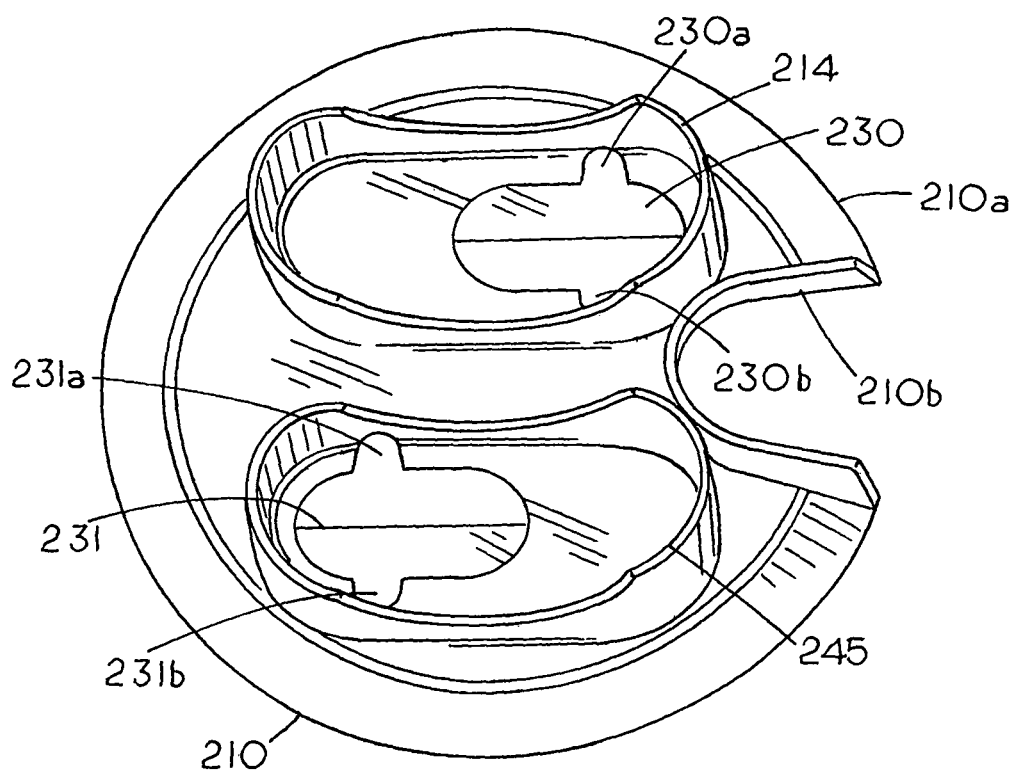
FIG. 21 is bottom view of the bulk feeder converter with a flow limiter.
Figure 22:
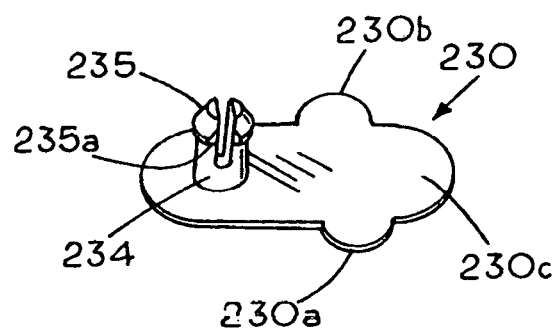
FIG. 22 is an isolated view of the flow limiter in the bulk feeder converter of FIG. 19.

While FIG. 19 shows the bulk feeder converter 210 without the flow limiters FIG. 20 and FIG. 21 show the bulk feeder converter 210 with flow limiter 230 and flow limiter 231. FIG. 22 shows flow limiter 230 comprises a planar flange member 231 having a first ear 230a and a second ear 230b. Located on one end of flow limiter 230 is a stud 234 having a split head 235 with a retaining shoulder 235a. Flow limiter 230 functions in the same manner as flow limiter 40 in that in one mode the flow limiter 230 can block flow through the ports in the web supporting the flow limiter and in a second mode the flow limiter is deactivated through engagement with a cam on dispensing cartridge.

Flow limiter 230 is shown in an isolated view in FIG. 22 revealing a stem 234 extending perpendicularly from the flat flange base 230c of the flow limiter 230. In this example the flow limiter comprises an elliptical shaped flange formed from a polymer plastic or the like with the flow limiter containing a first ear 230a on one side of flow limiter 230 and a second ear 230b on the opposite side of flow limiter 230 to maintain the flow limiter 230 properly positioned in the bulk converter. That is, as shown in FIG. 21 the ear 230a engages one side of curvilinear lip 214 and the ear 230b engages the other side of member curvilinear lip 214 to maintain the flow limiter in the proper orientation to cover the openings in web 213. Flow limiters 230 and 231 are identical and are shown in the closed condition in FIG. 21 to prevent or limit flow into the chamber of the dispenser valve 200 when there are no cartridges present in the bulk feeder 210.

However, when the flow limiter 230 is axially displaced from web 212 water can flow through the ports in web 212 and when flow limiter 231 is axially displaced from web 213 water can flow through the ports in web 213.

FIG. 20 is a top view of the bulk feeder converter 210 revealing a first socket 211 having a web 213 with a set of ports 213e and 213d. The end 247 of a stem of a flow limiter 230 extends through an opening in web 213 to permit axial displacement of flow limiter 230 in response to a cartridge placement in the bulk feeder. Similarly, a second socket 209 includes a web 212 with a set of ports 212d and 212e. The stem end 235 of a flow limiter 231 extends through an opening in web 212 to permit axial displacement of flow limiter 231 in response to a cartridge placement in the bulk feeder.

Figure 23:
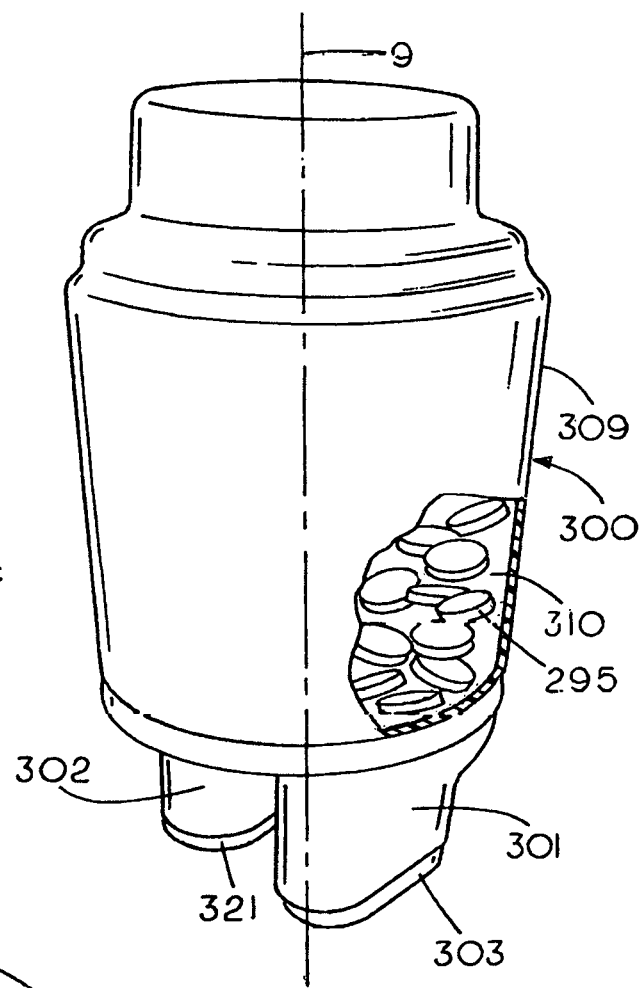
FIG. 23 is a perspective partially cutaway view of a dispenser cartridge.

FIG. 23 is a perspective partially cutaway view of a dispenser cartridge or canister 300 having a housing 309 with a dispenser chamber 310. Canister 300, which is axially insertable into bulk feeder 200, includes a halogen 295 such as chlorine or bromine although materials may be used without departing from the sprit and scope of the invention. Located on the bottom of canister 300 is a first leg 301 that terminates in a first elongated socket 303 and a second leg 302 that terminates in a second elongated socket 321.

Figure 24:
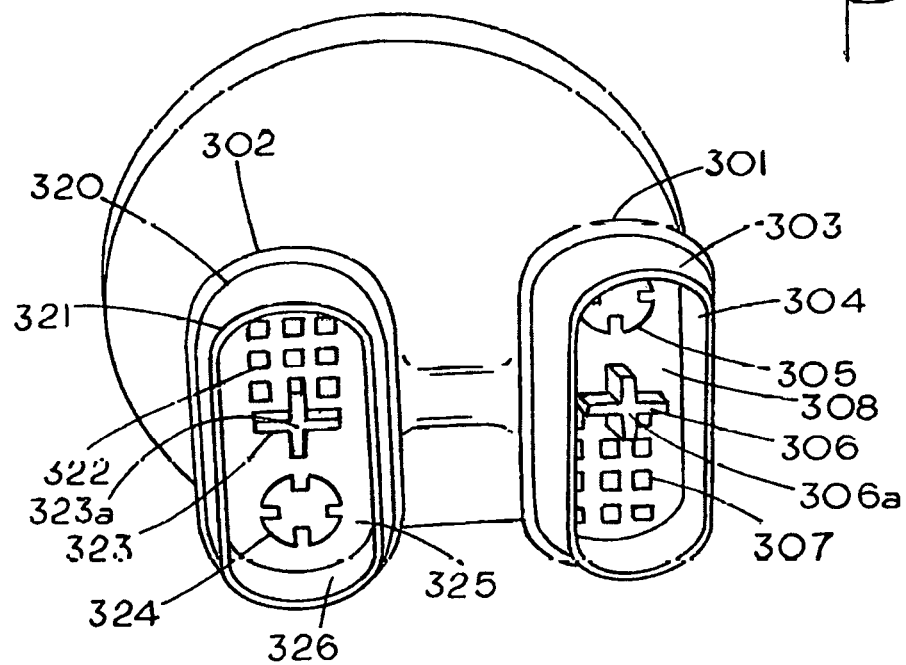
FIG. 24 is a bottom perspective view of the bulk feeder converter and the contoured sockets located thereon.
Figure 24A:
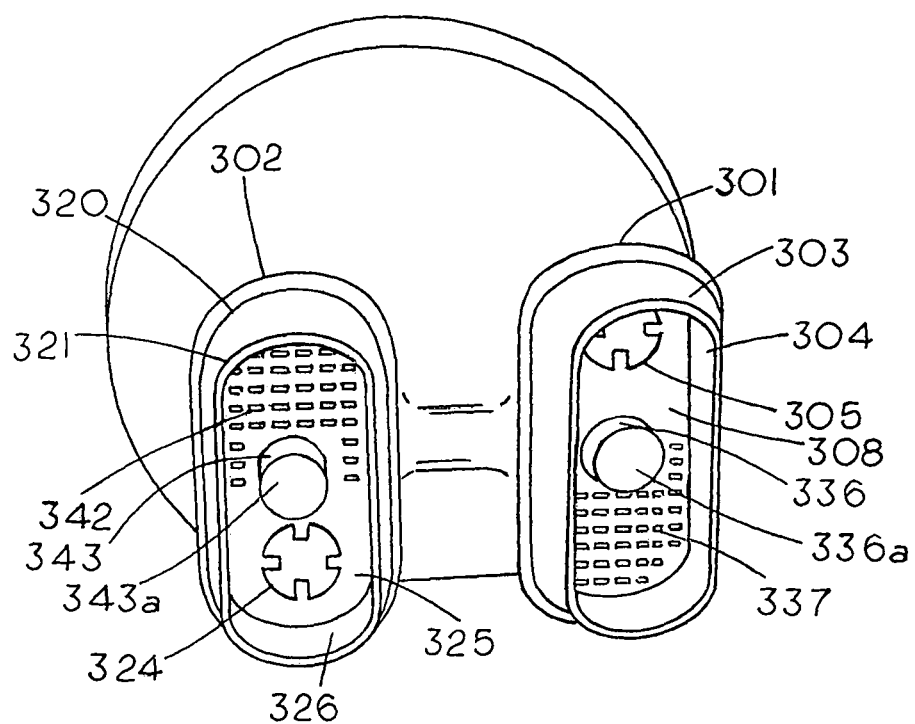
FIG. 24A is a bottom perspective view of the bulk feeder converter with a cylindrical deactivator cam.

FIG. 24 is a bottom perspective view revealing that the first elongated socket 303 includes an inside wall 304 that encompass a web 308. Web 308 may include a key slot for engagement with a mating key on a converter to prevent the canister 300 from being inserted improperly. Web 308 contains a set of openings 307 for passage of water into and out of the chamber 310 in canister 300. Secured to the bottom of web 308 is a cross-shaped deactivator cam 306 that is laterally offset from a socket sidewall 304 and the set of openings or ports 307 in web 308 with the cam extending axially outward from web 308 and terminated in a cam face 306a that can engage and deactivate a flow limiter in the converter 210 when the converter 210 and the canister 300 are in socket-to-socket engagement. Similarly, FIG. 24a shows an identical socket 302 with the deactivator comprising cylindrical post 343 having a top cam surface 343a and socket 31 with a cylindrical post 336 having a top cam surface 336a. In the example shown in FIG. 24A the openings 342 and 337 are rectangular in shape as compared to the square openings shown in FIG. 24 although other shape fluid openings may be used to provide for a fluid passage therethrough.

In the example shown the sidewall 304 around the web 308 extends a greater distance from the web 308 than the cam 306 to enable socket-to-socket engagement between the canister and the converter before the cam engages the flow limiter in the converter. The cam 306 is similar to cam 60c in that the cam 306 axially engages one of the flow limiters in converter 210 to permit water flow into the dispensing chamber 310 through the web supporting the flow limiter when the socket 303 of canister 300 is placed in a top socket of the converter 210. Canister 300 also includes a second socket 320 that includes an inside sidewall 326 that encompass a web 325. Web 325 may include a key slot for engagement with a mating key on a converter to prevent the canister 300 improper installation of the canister 300. Web 325 also contains a set of openings 322 for passage of water into and out of the chamber 310 in canister 300. Secured to the bottom of web 325 is a cross-shaped cam deactivator 323 that is laterally offset from sidewall 326 with cam 323 extending axially outward from web 325 so that axial insertion of the canister 300 into a converter in a bulk feeder engages and deactivates the flow limiter. In the example shown the sidewall 326 around web 325 extends a greater distance from the web 305 than the cam 323 to enable socket-to-socket engagement between the canister and the converter before the cam engages a flow limiter in the converter. In the example shown in FIG. 24 the cam face 306a in socket 303 and the cam face 323 in the socket 302 extend equal distance from the webs supporting them for simultaneously deactivation of converter flow limiters when the dispenser 300 and the converter 210 are brought into socket-to-socket engagement. Preferably, the first cam face 306a and the second cam face 323a are orthogonal positioned with respect to the central axis 9 of the dispenser 30 to enable the cam face to axially displace the flow limiters to minimize lateral forces on the stem of the flow limiters that may cause the flow limiters to bind as they are deactivated. In the example shown the cam 323 and the cam 306 are molded into the canister during the formation of the canister housing 309 and become an integral part of the canister housing.

In this embodiment the canister 300 includes two cams while the canister 60 and canister 70, as illustrated in FIGS. 11 and 11A, each contains a single cam for separately deactivating the flow limiters in the converter 30.

In this example both the flow limiters in the converter are deactivated by the cams so that water can flow through the converter and into and out of the dispenser cartridge.

We claim:

1. A method of controlling the flow of water through a dispensing valve having a flow limiter for allowing flow of water therethrough or blocking flow of water therethrough where the flow limiter is axially slideable from an open condition to a closed condition in response to an upstream water pressure in a dispensing valve where dispensing valve includes a plurality of fluid passages located proximate the flow limiter with the upstream water pressure in the dispensing valve urging the flow limiter to a closed condition to block water flow through the plurality of fluid passages located proximate the flow limiter; axially inserting a dispensing cartridge into a dispersant compartment of the dispensing valve; aligning a first socket in the dispensing cartridge with a first socket in the dispensing valve, and inserting the first socket in the dispensing valve into the first socket in the dispensing valve to form a flow path through the first socket in the dispensing valve and the first socket in the dispensing cartridge; aligning a second socket in the dispensing cartridge with a second socket in the dispensing valve and inserting the second socket in the dispensing cartridge into the second socket in the dispensing valve to form a further flow path through the second socket of the dispensing valve and the second socket of the dispensing cartridge; abutting a cam face on the dispensing cartridge with the flow limiter in the dispensing valve by pushing the first socket of the dispensing cartridge further into the first socket in the dispensing valve until a stem on the flow limiter engages a cam face on the dispensing cartridge; and deactivating the flow limiter in the dispensing valve by further displacing the stem on the flow limiter with the cam face on the dispensing cartridge to allow water flow into the dispensing cartridge around a flange on the flow limiter and through the plurality of fluid passage located proximate the flow limiter.

2. The method of claim 1 including activating the flow limiter to prevent the flow of water through the dispensing valve includes removing the dispensing cartridge from the dispensing valve to allow the upstream water pressure to displace the flow limiter to a condition where the flange on the flow limiter blocks flow of water through the dispensing valve.

3. The method of claim 1 including abutting the cam face on a rib located in the first socket where the rib extends axially outward from an end cap on the dispensing cartridge to initiate a flow of water through the dispensing valve.

4. The method of claim 1 including activation of the flow limiter by removing the dispensing cartridge from the dispensing valve to prevent flow of water into the dispensing valve.

5. The method of claim 1 deactivating the flow limiter in the dispensing valve by axially displacing the flow limiter and the flange therein to allow water flow into the dispensing cartridge through a set of ports in the dispensing cartridge.

6. The method of claim 1 when the dispensing cartridge contains chlorine.

7. The method of claim 1 when the flow limiter normally prevents the flow of water through the dispensing valve when the cam face is disengaged with the stem on the flow limiter.

8. The method of claim 1 including depressing the flow limiter with the cam face on the first dispensing cartridge through axial insertion of the first dispensing cartridge into engagement with a converter in the dispensing valve wherein the first dispensing cartridge contains chlorine.

9. The method of claim 8 where the first dispensing cartridge is nested within the second dispensing cartridge.

10. The method of claim 8 including removing the first dispensing cartridge from the dispensing valve to prevent water flow through the first flow limiter while the second dispensing cartridge prevents water flow through a second flow limiter in the dispensing valve.

\* \* \* \* \*